(12) United States Patent
Shamseddin et al.

(10) Patent No.: US 10,963,274 B2
(45) Date of Patent: Mar. 30, 2021

(54) DYNAMIC HELP SYSTEM USING HTML BASED APPLICATION FRAMEWORK

(71) Applicant: TOSHIBA TEC KABUSHIKI KAISHA, Tokyo (JP)

(72) Inventors: Mehdi Shamseddin, Macquarie Park (AU); Ben Lear, Bangor (AU); Timothy Gee, Schofields (AU); Lilian Ji, Burwood (AU)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/526,717

(22) Filed: Jul. 30, 2019

(65) Prior Publication Data

US 2020/0073684 A1 Mar. 5, 2020

Related U.S. Application Data

(60) Provisional application No. 62/726,802, filed on Sep. 4, 2018.

(51) Int. Cl.
*G06F 3/00* (2006.01)
*G06F 9/451* (2018.01)
(Continued)

(52) U.S. Cl.
CPC ............ *G06F 9/453* (2018.02); *G06F 3/0482* (2013.01); *G06F 3/04895* (2013.01); *G06F 8/65* (2013.01); *G06F 16/954* (2019.01); *G06F 16/957* (2019.01)

(58) Field of Classification Search
CPC ...... G06F 9/453; G06F 16/957; G06F 16/954; G06F 3/0482; G06F 3/04895; G06F 8/65
See application file for complete search history.

(56) References Cited

U.S. PATENT DOCUMENTS

2007/0220428 A1* 9/2007 Kureshy ............... G06F 9/451
  715/708
2011/0271185 A1* 11/2011 Chen ..................... G06F 9/451
  715/708

(Continued)

OTHER PUBLICATIONS

Prosunjit Biswas et al., Pagemap: A Dynamic User Guiding Approach to the Most Relevant and Popular Pages in a Website, Dec. 1, 2010, International Conference on Computer and Information Technology, pp. 1-6 (Year: 2010).*

(Continued)

*Primary Examiner* — Tam T Tran
(74) *Attorney, Agent, or Firm* — Kim & Stewart LLP

(57) ABSTRACT

There is disclosed a dynamic help system which can change and automatically update itself with relevant information based upon a user's needs to assist users in operating functions of a computer. The dynamic help system can create multiple types of pages that can seamlessly be integrated into a user interface already running on a computer. The dynamic help system may parse RAF or HTML-like user interface pages and components to create a corresponding help system also based upon RAF or HTML-like functions and layout. As a part of that process, snapshots of actual user interface components may be placed within the help system and used for navigation back to the user interface. The dynamic help system may be used by the user to obtain information and further interact with the user interface.

10 Claims, 19 Drawing Sheets

(51) Int. Cl.
*G06F 8/65* (2018.01)
*G06F 3/0489* (2013.01)
*G06F 16/957* (2019.01)
*G06F 16/954* (2019.01)
*G06F 3/0482* (2013.01)

(56) References Cited

U.S. PATENT DOCUMENTS

| 2014/0337727 | A1* | 11/2014 | Earurnthavadi ........ G06F 9/453 |
| | | | 715/708 |
| 2015/0227276 | A1 | 8/2015 | Batti et al. |
| 2016/0203004 | A1* | 7/2016 | Strong ................ G06F 3/04842 |
| | | | 715/708 |

OTHER PUBLICATIONS

Prasant Mohapatra et al., WebGraph: A Framework for Managing and Improving Performance of Dynamic Web Content, Sep. 1, 2002, IEEE Journal, vol. 20, No. 7, pp. 1414-1425 (Year: 2002).*

* cited by examiner

DYNAMIC HELP SYSTEM USING HTML BASED APPLICATION FRAMEWORK

RELATED APPLICATION INFORMATION

This patent claims priority from U.S. provisional patent application No. 62/726,802 entitled "Dynamic Help Display System Using HTML Based Application Framework" filed Sep. 4, 2018.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to user help systems associated with a user interface in a computing device and more specifically to a dynamic help system reliant upon a markup language and dynamic parsing of content to quickly provide detailed and relevant help information to users.

Description of the Related Art

Most software application today contain some form of a help system. These help systems may take many forms and operate in different ways. Most help systems provide a visual representation that show descriptions to help a user understand a particular feature about a piece of software or software function. Most help systems need to be coded separately and require constant updating if main software updates as well. Currently, there are several popular software tools that assist in creating help systems, these include Microsoft HTML Help Workshop, and HelpNDoc. Some software programs may embed custom help software in themselves. For example, some applications may have a "help" button or a "?" mark button somewhere within the user interface, or in close proximity to particular functions. When a user selects this button, a preprogrammed help window may open with preprogrammed instructions, guides, audio, or even videos for a user.

Using these help systems can often be frustrating and not as helpful as the designers would like. Often times using these help systems gives a user pre-canned help instructions that are either not helpful, or not narrowly tailored to the question or issue a user has in mind. And, as the software changes or the user interface changes, the associated help systems must be updated as well. Those updates sometimes hold back release schedules, or worse, do not hold back schedules. When they do not, the help system remains outdated and ineffectual.

Figure 1:
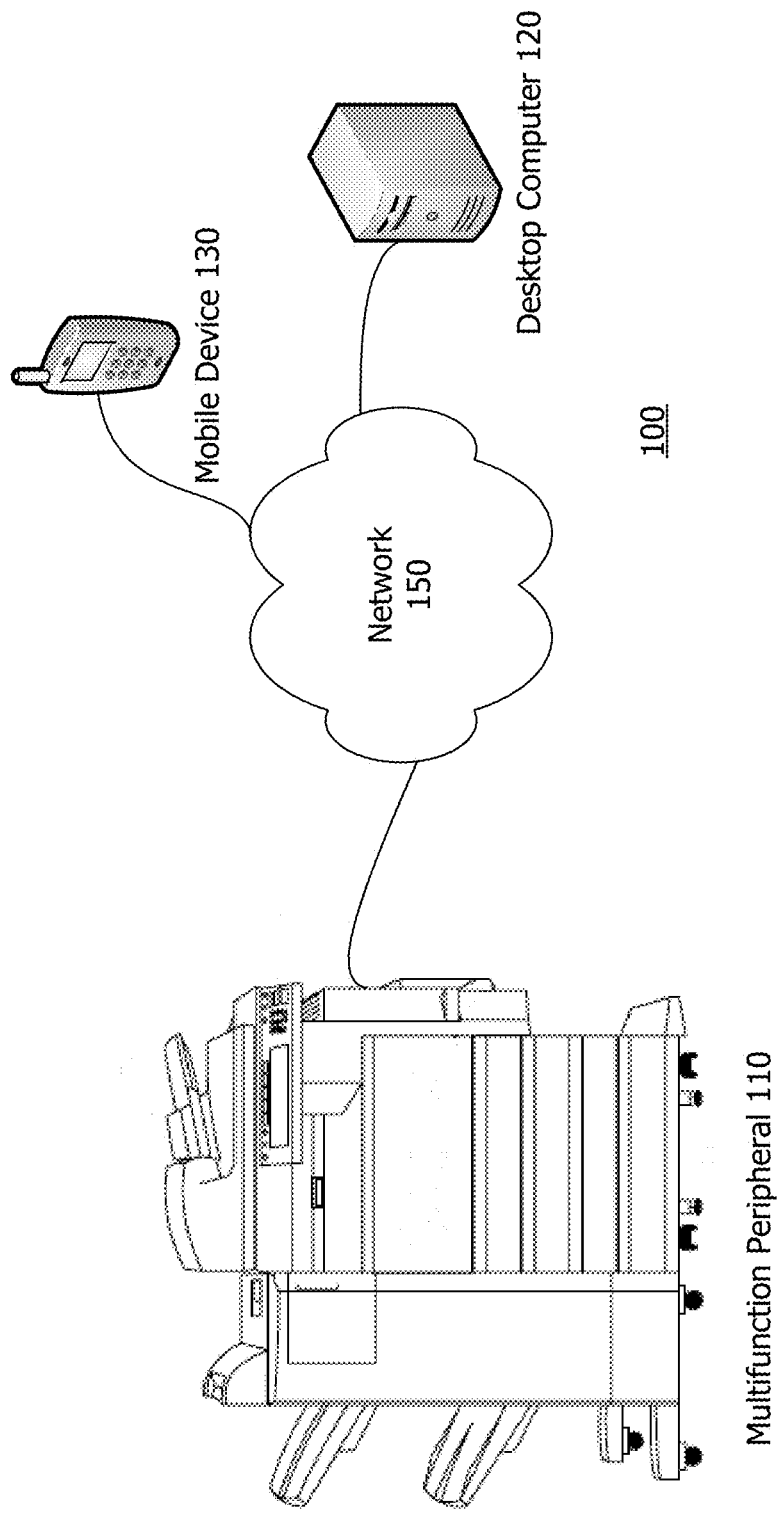
FIG. 1 is a diagram of a system of networked devices on which a dynamic help system may be used.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

A dynamic help system can provide two-way interactivity between help pages and associated parts of a user interface. A dynamic help system can dynamically create help pages based upon the components of a hypertext language upon which a user interface is based. The dynamic help pages can react to changes in the actual user interface and may even include components of the user interface, such as image snapshots of one or more relevant features, within a help page. A user may click on hyperlinked portions of the dynamic help page to learn more, and may interact with image snapshots to return to a relevant corresponding feature in a help page or in the user interface itself.

A dynamic help system may be a separate application or content system from a user interface. The dynamic help system may also be created using a hypertext language. A hypertext language, as used herein, is any language, program or software capable of linking documents to one another so that a user may interact with one document in some way (e.g. a click) and be directed automatically to another document or portion of a document. Hypertext markup language (HTML) is the most common example of such a language but other languages, including CSS, JavaScript, or even databases such as traditional Microsoft® help databases may in whole or in part also be considered hypertext languages.

The dynamic help system may also be a component or sub-component within a user interface. The dynamic help system may take the form of a piece of software within a user interface, an application within or separate from the user interface. In one example, the user interface may take the form of a Rich Application Framework (RAF) document. An RAF provides a ready, and cross platform system for creating user interfaces. Developers are generally familiar with its components (HTML, CSS/JavaScript) and it may be easily read and parsed using well-known browser frameworks or toolkits that are generally standard in most modern operating systems.

The familiarity and ease of access to the associated RAF user interfaces may be leveraged to more easily create dynamic help pages based upon the contents of those RAF user interface components. Many examples of applications that use RAF or RAF-like user interfaces exist. Any program that uses traditional HTML pages or links files to each other may also potentially be considered a RAF. Examples of these types of systems are common now, where mobile applications (e.g. iPhone applications) provide minimal fixed user interface components, but provide their user interface interactions primarily through the loading and parsing of a series of secure web pages loaded within an embedded browser in a given mobile application.

The dynamic help system may be preprogrammed with a user interface's design structure or may dynamically parse the user interface to determine and save a structure associated with an RAF. Parsing often includes indexing the pages that make up the user interface and indexing which features belong to what page. Features include items a user can interact with such as help buttons, save buttons, "OK" buttons, print buttons, print functions, layout functions, selection tools, radio buttons, checkboxes, formatting options, color options, and many other functions found on print settings or other types of user interfaces. dynamic help system can also detect the existing help contents in help packages (containing HTML pages that provide descriptions or other visuals for pages or features) and may associate them with a user interface automatically reliant upon a detection of relevant keywords (e.g. the label of a button matches the label of a help system item). This is particularly useful in a scenario when there are help contents for each individual feature but their place in the user interface changes later on (e.g. a customized user interface is introduced in later versions of a user interface or other software). In such a scenario, normal help systems contents ordinarily should be changed manually to reflect the new feature locations. But, as discussed above, sometimes they are not. A dynamic help system can detect this and automatically associate the relevant help data dynamically.

A dynamic help system can also detect if the current help page is about a particular feature in a user interface. If a current help page does correspond to a particular feature, the dynamic help system can inject a snapshot of the feature into the page. Users can click on this snapshot and go back to the related feature in the user interface or within the help structure itself. This is particularly useful when the users start browsing contents in the help window and navigate to a new page and new feature. Then, while in the help structure, the user finds the relevant feature and wishes to return to using the application itself. By clicking on the feature snapshot image, the user may be forwarded back to the actual location of the feature.

In addition, the dynamic help system may dynamically generate individual help pages for each user interface page. As a result, the dynamic help system is capable of integrating downloaded help contents for particular pages or user interface features into the help system automatically. This way, other help contents or home and index pages do not need to be redownloaded or duplicated as a part of any update procedure.

Description of Apparatus

FIG. 1 is a system 100 of networked devices on which a dynamic help system may be used. The system 100 may include a multifunctional peripheral (MFP) 110, a desktop computer 120, and a mobile device 130 and be interconnected using a network 150. Not all elements are required to use the dynamic help system, this arrangement is an example of how a system can be set up and how user may interact with a dynamic help system. In many cases, the dynamic help system may operate entirely upon one computing device such as the desktop computer 120, the mobile device 130 or the multifunction peripheral 110.

In one example, a user may interact with desktop computer 120 to print a document. The user may open software on desktop computer 120, such as Microsoft® Word® that allows them to view and print a document. Upon requesting printing a document in Microsoft® Word®, a user interface such as the Word® print menu may appear. The dynamic help system may then incorporate into the Microsoft® Word® print menu and allow a user to interact better with the help menu. A user can interact with a printing menu and dynamic help system on a mobile device 130 or the MFP 110 itself in other cases. Additionally, the dynamic help system may either load from the same device a user is using to view and print a document (desktop computer, 120, mobile device 130 MFP 110) or load from another device to a target device using the network 150.

The network 150 may be or include the internet but is primarily used as a communications system for enabling the various components of the system 100 to communicate with one another. Additionally, the dynamic help system may load from one of the above devices but check for updates using network 150. Packages (discussed later) and data may be pushed from other devices (e.g. update servers, not shown) on the network 150 to the dynamic help system software residing on a mobile device 130, desktop computer 120, or multifunctional peripheral 110.

Figure 2:
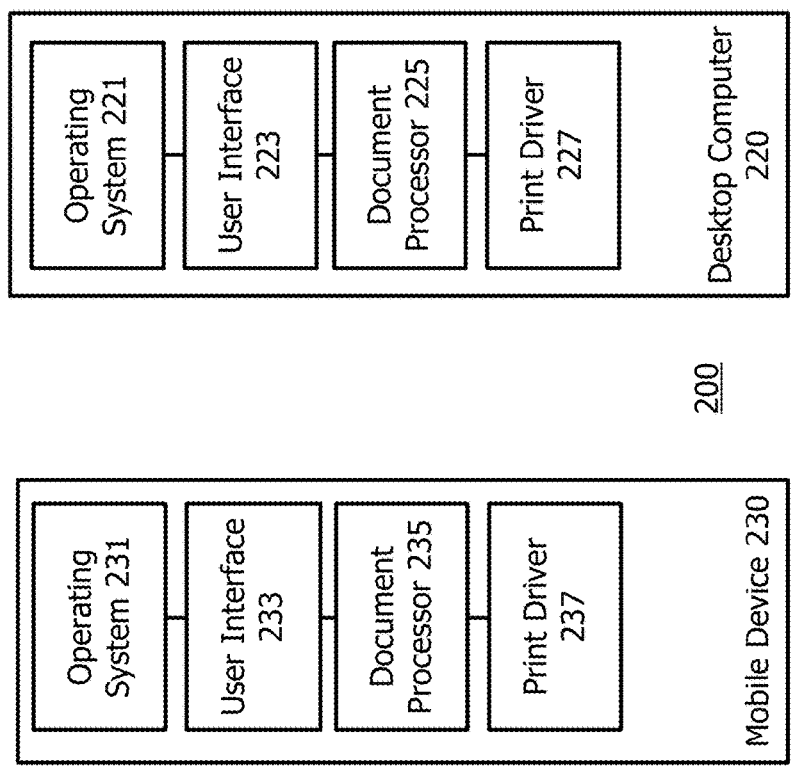
FIG. 2 is a block diagram of a functional components of a dynamic help system.

FIG. 2 is a block diagram of a functional components of a desktop computer 220 and mobile device 230 of a dynamic help system 200. The system includes the same desktop computer 220, and mobile device 230, as FIG. 1. This figure is intentionally simplified to focus only on those elements that are most relevant to this disclosure. As a result, components or functions have been omitted that may or may not be present in each element of this system 200. For example, a multifunction peripheral, such as MFP 110 may operate in much the same way as either the mobile device 220 or 230 discussed below.

The desktop computer 220 or mobile device 230, includes at least an operating system 221, 231 a user interface 223, 233 a document processor 225, 235 and a print driver 227, 237. Operating system 221, 231 may run software capable of opening and running both a user interface 223, 233 and document processor 225, 235. Document processor 225, 235 may be any software capable of viewing and printing documents including Microsoft® Word®, Open Office, Adobe® Acrobat Reader® Apple® Pages. User interface 223, 233 can be a portion of the operating system 221, 231 or other user software that a user interacts with, such as document processor 225, 235. In other instances, the user interface 223, 233 may be, in whole or in part, the dynamic help system itself or be generated by the dynamic help system in concert with other software. For example, if a user runs Microsoft® Word® as document processor 225, 235, the user interface 223, 233 may be both that of the operating system 221, 213 itself as well as that of the document processor 225, 235. A dynamic help system may show up within the operating system 221, 231 itself or may be triggered as a pop-up menu when a person clicks the print button inside Microsoft® Word®. Finally, the printer drivers 227, 237 are software that enables the document processor 222, 232 to output documents for printing. The printer drivers 227, 237 may include detection capabilities to recognize portions of the text and images within the documents generated by the word processor as will be described more fully below.

Figure 3:
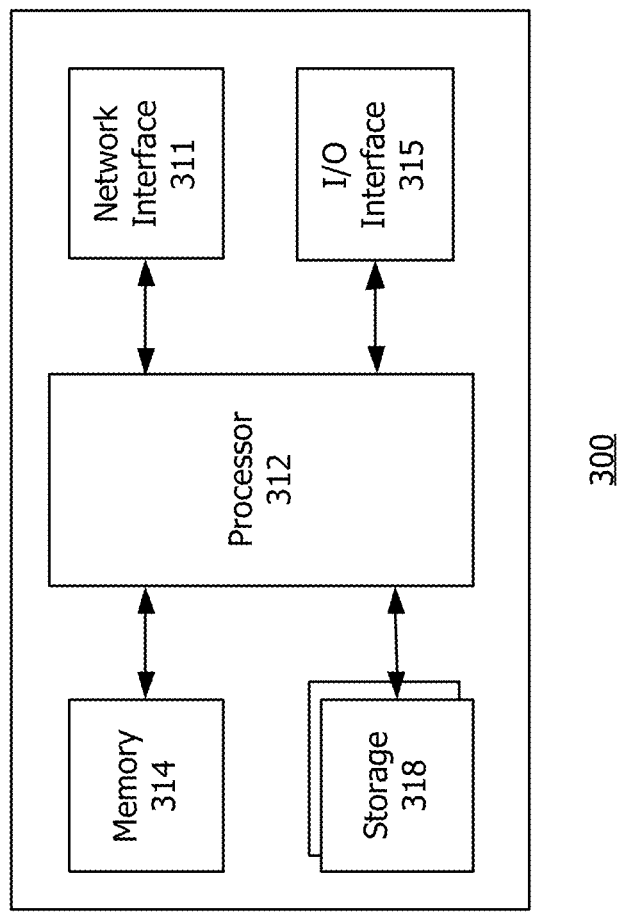
FIG. 3 is a block diagram of a computing device.

Turning now to FIG. 3, a block diagram of a computing device 300 is shown. The computing device 300 may be representative of the server computers, client devices, mobile devices and other computing devices discussed herein. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 may have a processor 312 coupled to a memory 314, storage 318, a network interface 311 and an I/O interface 315. The processor may be or include one or more microprocessors and application specific integrated circuits (ASICs).

The memory 314 may be or include RAM, ROM, DRAM, SRAM and MRAM, and may include firmware, such as static data or fixed instructions, BIOS, system functions, configuration data, and other routines used during the operation of the computing device 300 and processor 312. The memory 314 also provides a storage area for data and instructions associated with applications and data handled by the processor 312. As used herein, the word memory specifically excludes transitory medium such as signals and propagating waveforms.

The storage 318 may provide non-volatile, bulk or long-term storage of data or instructions in the computing device 300. The storage 318 may take the form of a disk, tape, CD, DVD, or other reasonably high capacity addressable or serial storage medium. Multiple storage devices may be provided or available to the computing device 300. Some of these storage devices may be external to the computing device 300, such as network storage or cloud-based storage. As used herein, the word storage specifically excludes transitory medium such as signals and propagating waveforms.

The network interface 311 may be configured to interface to a network such as network 150 (FIG. 1).

The I/O interface 315 may be configured to interface the processor 312 to peripherals (not shown) such as displays, keyboards printers and USB devices.

Figure 4:
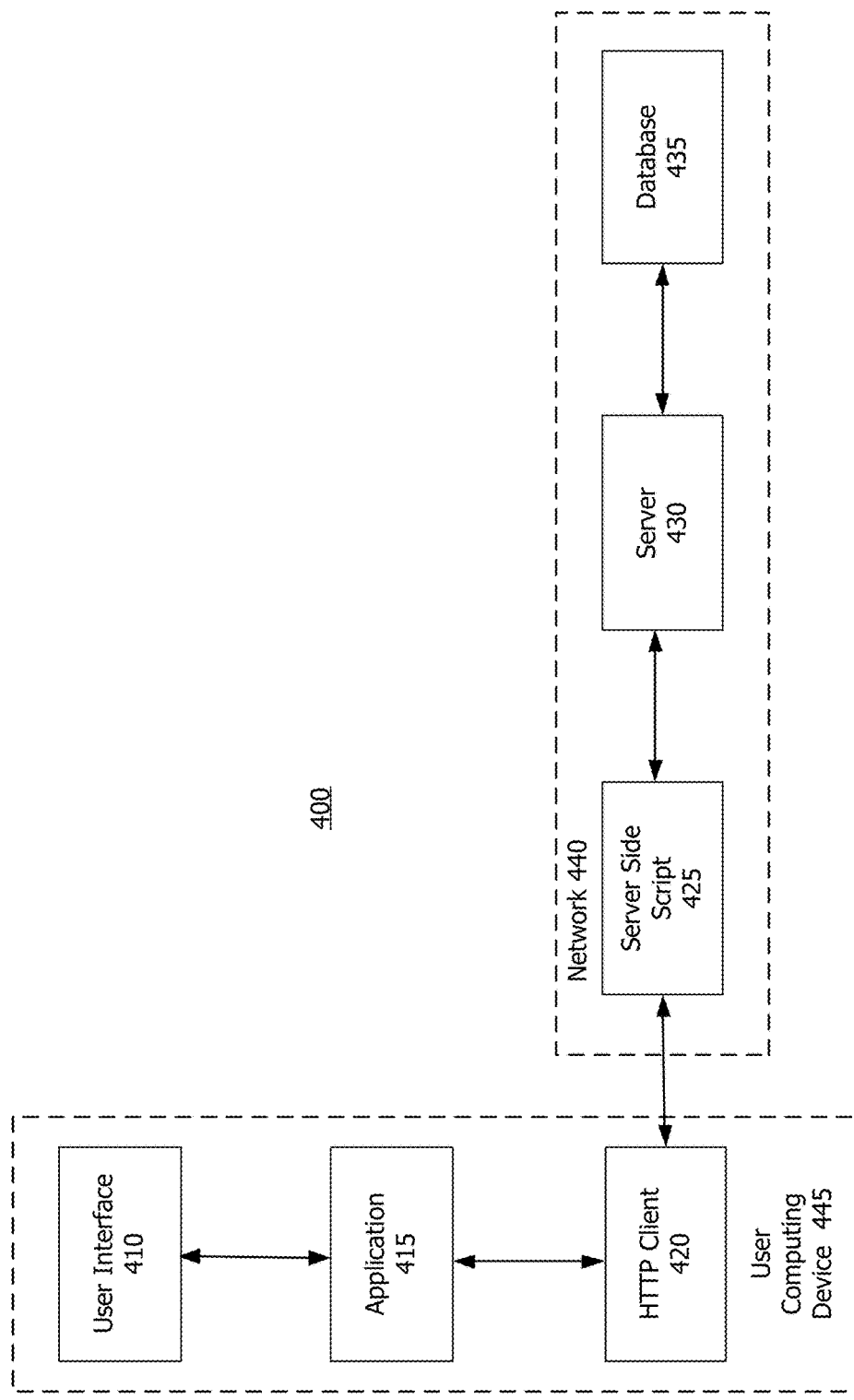
FIG. 4 is a functional diagram of how a dynamic help system may function over a network.

Turning to FIG. 4, functional diagram of how a dynamic help system may function over a network. The system may be fully self-contained, with all relevant data and help files resident on a single device. Or, the system may gather or incorporate information from remote sources, such as servers and databases resident on other computers available via a network. The system may rely upon an HTML framework 400 that is similar to how a typical HTML system works when using a web browser and the internet. The framework may be thought of as having two overarching components, a user computing device 445, and a network 440. The user computing device 445 is a desktop computer, mobile device, or MFP, as discussed above. The network 440 is made up of one or more other devices connected to or in communication with the user computing device 445.

Within the user computing device, a user interface 410 may interact with and exchange data with application 415. Application 415 may be any piece of software. In the system, the dynamic help system may reside in application 415, however a dynamic help system may obtain and load data from other components of the framework 400.

Specifically, application 415 may interact with and exchange data with the network 440 using a hypertext transfer protocol (HTTP) client 420. In other instances, software application 415 may be or include an HTTP client 420. The application 415 and HTTP client 420 are separated in FIG. 400 for ease of understanding how system 400 works.

The HTTP client 420 may then interact with and exchange data with server side script 425. The server side script, 425 is any piece of code or software running on a server necessary for the server to receive, send, or interact with data. The server side script 425 then pushes or receives data from server 430. Server 430 may contain information about discrete features used in both a user interface 410, and the dynamic help system. Examples of information on server 430 are RAF's, applications, HTML files, or pieces of code necessary for dynamic help system to operate. Server 430 may also interact with and exchange data with database 435 which may store the associated information. In other forms, database 435 and server 430 may be integrated into the same device or software. The server 430 and database 435 are separated in FIG. 400 for ease of understanding how system 400 works.

Figure 5:
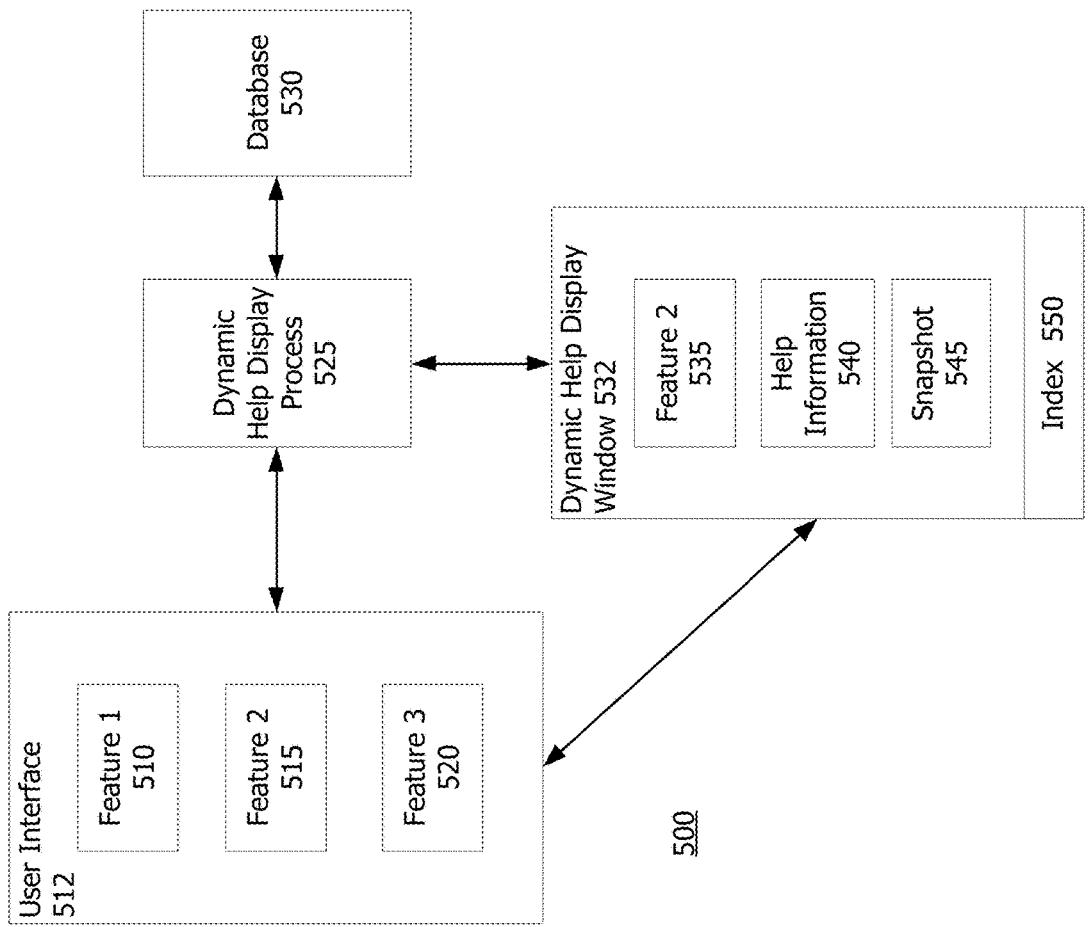
FIG. 5 is a functional diagram of a dynamic help system making a dynamic help window.

FIG. 5 is a functional diagram of a dynamic help system making a dynamic help window. User interface 512 displays to the user three separate features, feature 1, 510, feature 2, 515, and feature 3, 520. Features include any aspect or component of the user interface with which a user can interact. For example, features may be a print button, a print black and white button, a holepunch button, a save button, a start button, an icon, an image, a menu, a cancel button, or other features.

Information regarding interaction with or selection of a feature may be exchanged between the user interface 512, and dynamic help display process 525. Dynamic help display process 525 may, for example, upon selection of an associated help function or similar interaction, parse the features, 510, 515, 520, of the user interface 512 to generate dynamic help display window 532. The dynamic help display process 525 may also exchange information with database 530 to find information regarding each of the features 510, 515, and 520 of user interface 512. Database 530 may contain information in the form of pre-existing help information, HTML pages, screenshots, programs, pre-defined information, or executable code regarding the features, 510, 515, and 520, of user interface 512. Once dynamic help display process has gathered and processed information from user interface 512 and database 530, it may generate a new dynamic help display window 532.

The dynamic help display window 532 arranges features to show to the user based on the flow of information from database 530 and user interface 512. In overview 500, the user may have selected help or more information regarding feature 2, 515. In such a case, dynamic help display window 532 may show feature 2 535, and associated help documentation, in dynamic help display window 532. Additionally, help information 540, which was pulled from database 530 is also displayed. Help information 540 can be text, gifs, pictures, snapshots, videos, links, pre-existing or hard-coded help data, or other data alone or a combination with one another, all of which relating to the associated feature, feature 2 515. The help information 540 may be pre-existing or may be dynamically generated as discussed below.

In addition, a snapshot 545, which may have been pulled from database 530 or generated by dynamic help display process 525 from user interface 512, may also be integrated into dynamic help display 532. The snapshot 545 may be generated in real-time based upon a help request associated specifically with a portion of a user interface or user interface element.

The dynamic help display window 532 may operate independently as a component of an application (e.g. the help system) that is not reliant upon a hypertext language, but preferably an index 550 is generated and inserted into dynamic help display window 532 to enable navigation through the help system. Index 550 may be generated from HTML pages and data (e.g. a pre-existing help database) obtained from database 530. Index 550 may be used to navigate the dynamic help display window 535 from one topic to another using hyperlinks (or similar data structures).

In some instances, some of the elements listed in dynamic help display window 535 may contain links to either other pages of dynamic help display 535 or may link back to the original user interface 512. This is useful because if a user initiated the dynamic help process in response to questions about feature 2 515, then the help user interface may be used to easily navigate back to that user interface 512 element once the help process is complete. This enables a dynamic interaction with minimal friction to a user interacting with the help system and continuing use of the system as before.

Description of Processes

Figure 6:
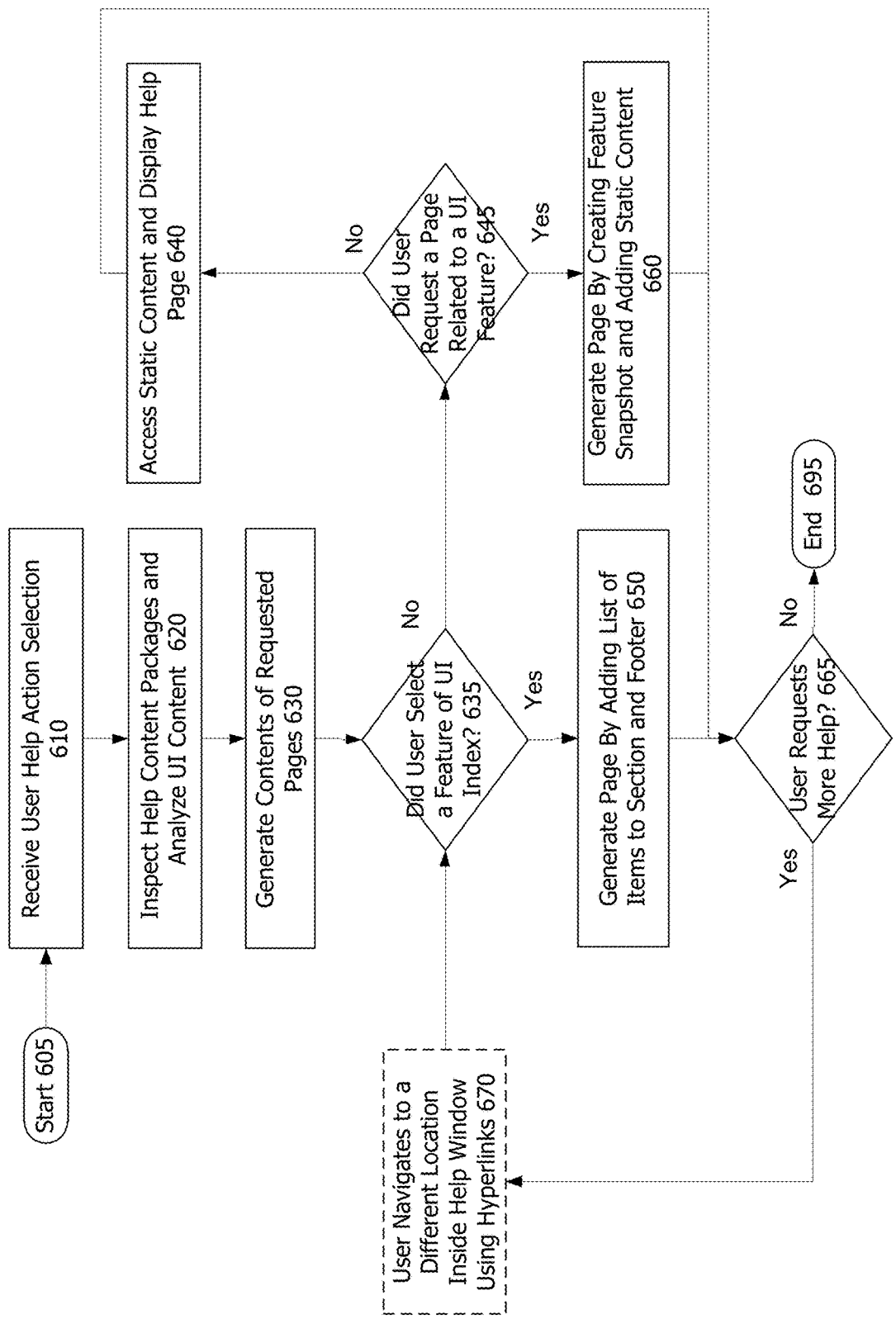
FIG. 6 is a flowchart of a user navigating and using a dynamic help system which creates dynamic help windows.

FIG. 6 shows flowchart of a user navigating and using a dynamic help system which creates dynamic help windows. The process begins at start 605 and ends at end 695. As can be seen, the process may recur through continued interaction with the dynamic help system or by re-initiation of the dynamic help system at a later time. In this sense, the process may take place many times.

The start 605 may begin once a user has begun using software or begun using an operating system, computer, multifunction peripheral or the like. Therein, a user may execute software and prepare to interact with software or interact with features. At some point, a user may have questions about options and features presented to the user within that software (e.g. a print dialogue), and the user may select a help button. That selection triggers receipt of a help request or other user help action selection at 610. This may be an overt help button (e.g. a button with a large "?" on it) or may be a keyboard shortcut (e.g. Ctrl+H), or may be some combination of mouse and on-screen menus or touchscreen interactions. The associated help function may be a part of an operating system, a part of a particular piece of software, or for a particular device (e.g. a mobile device or MFP). The help button can either be generated by dynamic help system and implemented into a piece of software running on a computer or be a help button that is built into operating software such as Word®.

At 620, in response to the help action selection at 610, the dynamic help system then inspects help content packages and analyzes user interface content. Specifically, two elements are searched to find relevant help descriptions. The help content packages are inspected, meaning that the help packages created and provided along with the software or hardware are analyzed to pull out content that may be relevant to the help process for a particular user interface element. As a part of doing this, the entire help content packages may be parsed (discussed more fully with respect to FIG. 8 below). In addition, the user interface itself may be analyzed. In this process, the dynamic help system may scan for different features present on a page (or pages) of the user interface. These features may be associated with the help content packages which were already parsed by the dynamic help system. In this step in particular, the use of the Rich Application Framework (RAF) enables parsing to take place relatively easily. Given that the language is essentially a hypertext markup language, parsing can be completed using a web browser-like software. Once the inspection is complete, the help content packages may be either stored in dynamic help system itself, or on a database or server.

The dynamic help system then generates contents of the requested page at 630 using static help contents and the associated user interface analysis. This generation preferably takes the form of an HTML or HTML-like interface wherein a user may click through the components. As a part of this parsing, and as discussed more below with respect to FIG. 8, the dynamic help system may organize these help contents so as to correspond exactly to the components making up the RAF user interface. The static help contents (e.g. a help database) may be dynamically injected into appropriate portions of the help contents, once the layout is determined, based upon where those same portions appear in the actual user interface (based upon the RAF discovery process). The static help contents—now part of the dynamic help system—may be displayed as links for a user to click or links to other pages of the dynamic help system. A user may then read, select, or otherwise interact with contents of the help contents to seek assistance.

Next, the dynamic help system determines if a user has selected a feature of the user interface index at 635. This means the dynamic help system determines if the user has requested a generalized help or assistance related to a particular entire pane or page of a user interface. If the user has selected a feature of the user interface index ("yes" at 635), then the dynamic help system generates a page or pages by adding lists of items from the user interface (discovered at 620) into a list of items at 650. So, for example, if the page is a home page (the page a user is directly looking at or a primary user interface page) then listed items are hyperlinks to other pages of the user interface that correspond to the components, tabs, or other portions of the user interface visible on that user interface page. If the page is an index page (a page the dynamic help system will generate, but not immediately presented to the user) pages for the associated functions and portions of the user interface at 650. These may be listed as hyperlinks to features present within the user interface page. In this way, when a user of the help system clicks on a particular function or portion of the user interface within the help system, the user may be presented with the associated functions or further index pages.

Further interaction with the help system may be interpreted as user requests for more help at 665. So, if a user requests additional help ("yes" at 665), then the process proceeds. Here the user may, optionally, navigate to a different location within the dynamic help system. That different portion may be a feature of the user interface index suitable for determination at 635, or it may be a page related to a feature (discussed below) at 645. If the user does not request additional help ("no" at 665) and ceases interaction with the help system, then the process can end at 695.

Returning to 635, if a user does not select a feature of the user interface index ("no" at 635), then the dynamic help system then checks to see if a user requested a page related to a user interface feature at 645. If the user did select a user interface feature ("yes" at 645), then dynamic help system will create a snapshot of the associated feature (i.e. an actual image of the feature within the user interface) and gather information including any statics content from the help module to generate a page for the user to see at 660. The associated page may include the snapshot (e.g. at the top of such a page) and any associated content the dynamic help system gathered from static sources or from any database or other source of help information. The snapshot in particular may be dynamically generated from the active user interface page or user interface content (e.g. content stored or referenced in a RAF user interface). In this way, as the user is seeking help, he or she may simultaneously see the actual component or feature of the user interface about which the help is informing the user. This can significantly aid in understanding.

If the user did not request a page related to the user interface feature ("no" at 645), then the feature selected was likely static. As a result, the static help system will be accessed and displayed 640. Thus, dynamic help system can access an existing help page, or use content from a static help system to generate a help page for the user to view based on information about the associated feature without having to create a new help page. The static page is likely stored in a database and is created by programmers as they initially create the software or user interface. An example of such a help page may be a description of the general process of using software itself or the purposes of such software. As above, further help requests at 665 may result in further dynamic help system operation. Otherwise, the process can end at 695.

Figure 7:
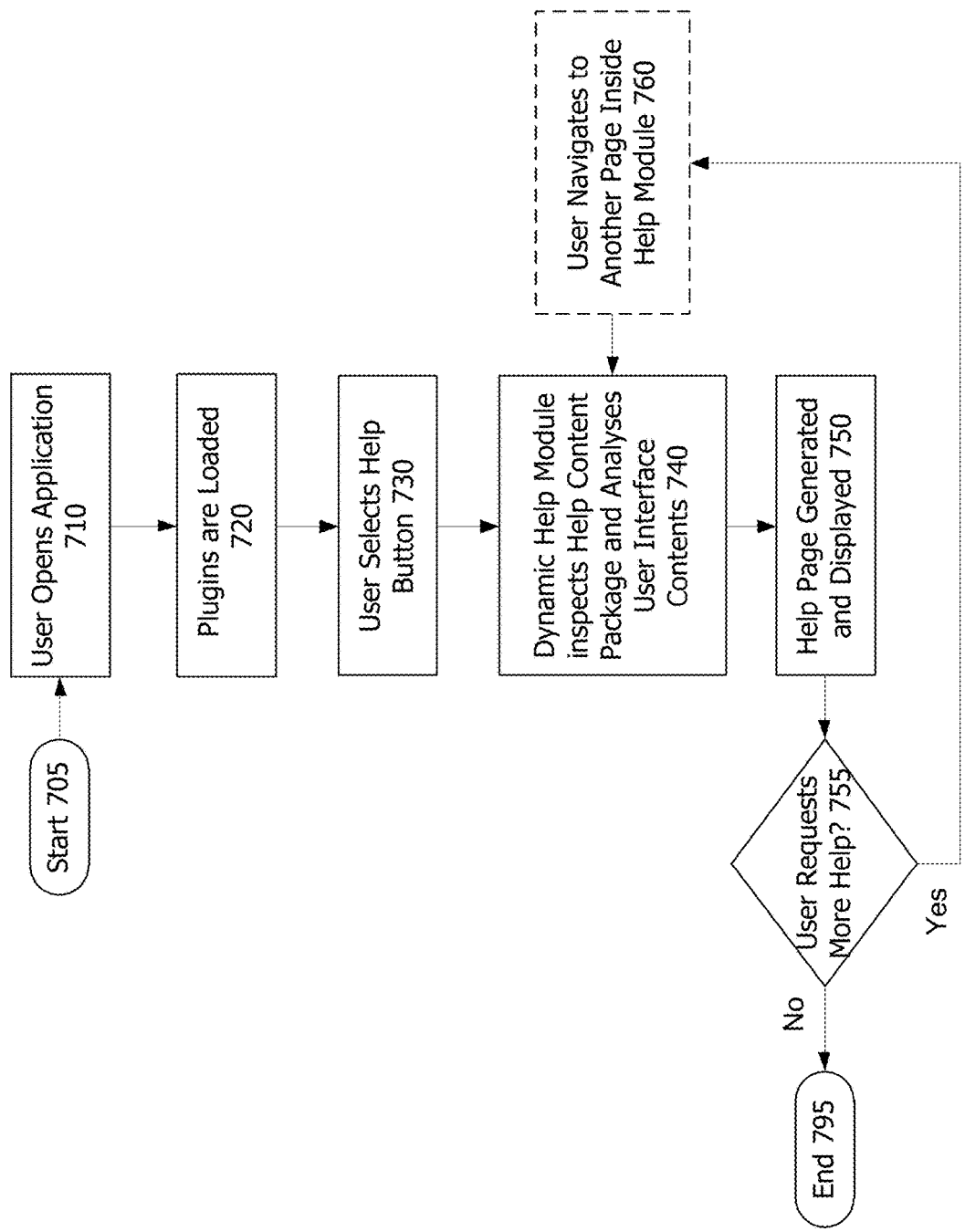
FIG. 7 is a flowchart of a dynamic help system creating a help window.

FIG. 7 is a flowchart of a dynamic help system creating a help window. Following the start at 705, the process begins with a user request to open or execute an application at 710. While operating the device, the user opens an application such as a word processor or web browser and is presented with a user interface for that application at 710. Preferably, the application is of a type in which its user interface is defined using HTML-like elements, such as an RAF user interface.

Thereafter, or as the program is loading, various plugins may be loaded at 720. These may be addons or aspects of the software that are used to accomplish various functions (e.g. popups, printing, web browsing, etc.). As a part of this process, one of those plugins loaded may be the dynamic help system. Alternatively, the dynamic help system may only operate upon initiation of a help request. Software plugins include software applications or individual pieces of code that run in the software programs, these include RAF's Javascript files, Applets, software applications, python modules and others. Any piece of software that may work in an HTML page may also be used as a plugin. The dynamic help system itself may be coded as a dynamic help module within the actual application which launches at 710, rather than as a plugin launched at 720. Plugins may also be or include HTML pages and scripts that can run in them.

After launching the application and loading any plugins, a user may then select a help button at 730, which may be generated by the application. Though described as a help button, this may actually be any method or system for initiating a help process within software. With the help button selected, the dynamic help system in the form of a dynamic help module inspects the help content packages and analyzes the user interface contents at 740. Based on the information in the help content packages and user interface contents analyzed at 740, a help page is generated and displayed at 750.

Thereafter, a user may request additional help ("yes" at 755). This may be, for example, by a user navigating to another page inside the help module at 760 (presented as an optional step), or by later interaction with the help system. In either case, the process can repeat until complete ("no" at 755). The process repeats generating new help pages until the user stops at 795.

Figure 8:
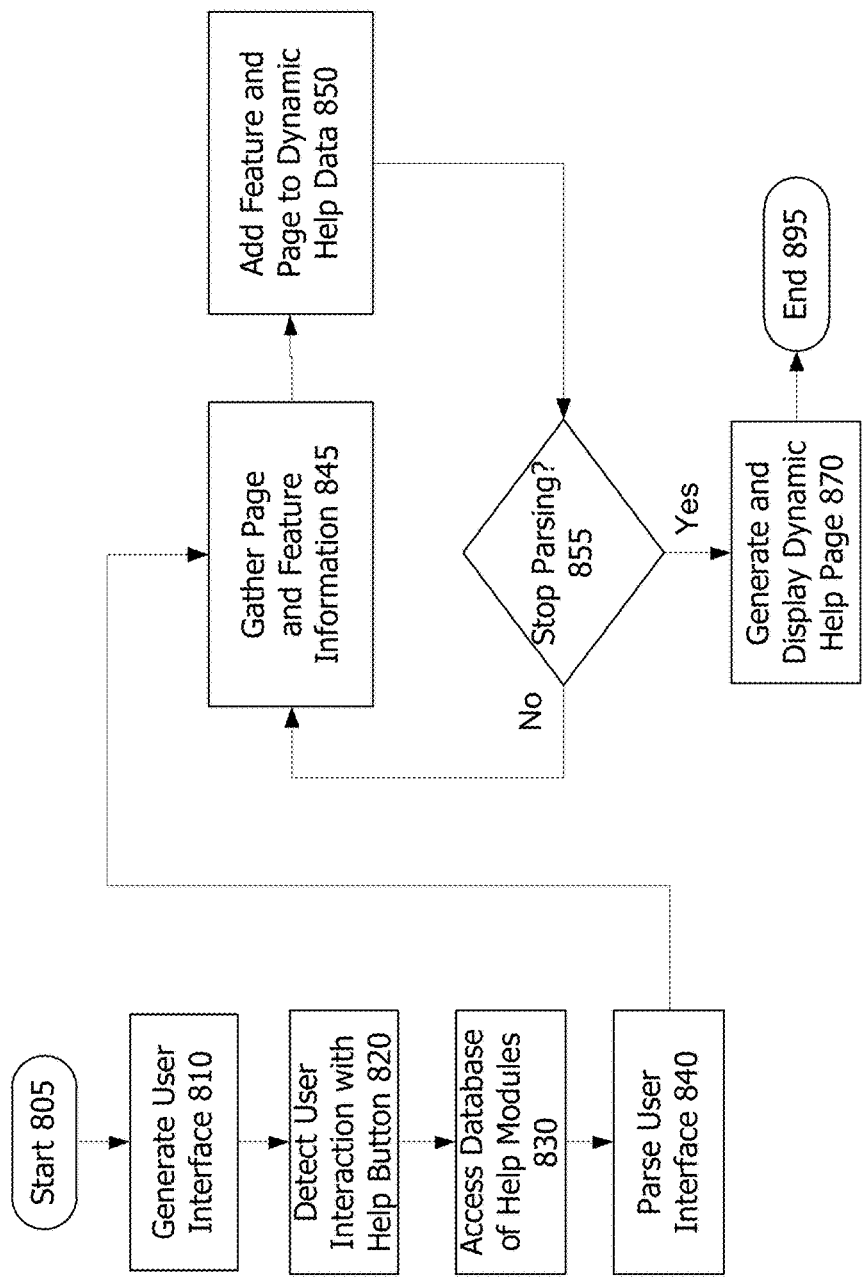
FIG. 8 is a flowchart of a dynamic help system parsing a user interface and generating a help window.

FIG. 8 is a flowchart of a dynamic help system parsing a user interface and generating a help window. A user starts the process at 805 by opening up a program capable of printing a document. The program will then generate a user interface at 810 that the user may select options from. User interfaces may be included as a part of the software itself, or a menu that opens up when a user operates particular functions. When the user interface 810 has been generated, the software may operate as expected for an indeterminate amount of time.

However, the dynamic help system may detect user interaction with a help button at 820. As indicated above, this may not be a "help" button, but may be some other form of help request interaction. Thereafter, the dynamic help system may access a database of help modules 830. This database of help modules may be either a part of the dynamic help system itself, or be located on another part of the network. The database may be, for example, a static help system or database or web-based system provided with the associated software. It may also be or include any additions or components that may be stored as a part of the dynamic help system. In some cases, these may be updated or altered based upon a web-based system that accesses or stores further information at a web location or network location. The database of help modules, may contain information regarding various features of the user interface generated at 810. This information can be in the form of detailed information about parts of the user interface, information in the form of text regarding various features of the user interface, and small animations or videos regarding the various features. It may also simply be generalized instructions in how to use the software or functions of the software. This information can also be links to websites which have information regarding the various features and functions.

Next, the dynamic help system then parses the user interface at 840. The parsing at 840 initiates multiple processes. The dynamic help system identifies if there are any pages and/or a discrete features in the user interface at 845. A discrete feature may be predefined in a database previously or discovered by the dynamic help system. For example, if the user interface appears in Microsoft® Word®, and the dynamic help system has previously programmed (or previously detected) discrete features, then this step may involve the detection of any information about that discrete feature and may gather that relevant information about that feature from an associated database or other data repository.

Examples of discrete features may include options the user may select in a menu, for example, a print menu such as print all pages, print on both sides, select printer, or many more. Other discrete features may be, for example, save functions, open functions, accept and cancel buttons, menu items, toggles, and the like. If a program such as Word® is later updated to include more features, and these features are then programmed into a static help system associated with those updates, then these features may appear in the dynamic help system if they are present. In other versions, dynamic help system may scan the user interface and identify features itself and load them into a database after identifying them. In other instances, dynamic help system may combine modules to create a new help page for features that are not identified.

Once the dynamic help system has gathered the discrete features it determines using the static help database whether there is a page, still at 845. The pages are entire user interface pages. As a part of this process, the dynamic help system passes through each page or tab of a user interface, and for each page parses each feature as discussed above. For each of those pages, and for each of those features, the dynamic help system gathers relevant information from any static help pages, documents or systems, and attempts to correlate them to the parsed version of the pages and features combinations. So, for example, for a given user interface, it may rely upon a series of tabs. On each tab may be a series of features such as print, save, formatting options, and the like. This process at 845 may parse recursively through the entire user interface, then search for relevant help data to associate with that user interface. Details of this process will be discussed more fully below with respect to FIG. 9.

The associated feature may be information about the feature such as information to be displayed in a help menu. The page may be a help page or portion of a help page itself. These pages may be in the form of an HTML page or pages. The feature and page are then added to a page list at 850. The list is preferably a hypertext or hypertext-like document that may be navigated through clicking. It also makes it easier for the system to parse and for the system to generate using web browser based systems. The list alternatively may be in the form of a database, stored as data on a remote server, or as a part of a different software application.

The system next determines whether to stop parsing at 855. If pages and/or features remain that are unparsed ("no" at 855), then the process continues. Once all the features of a given user interface have been identified and parsed ("yes" at 865), the dynamic help system generates a dynamic help page at 870.

If a particular feature was selected for help, then the dynamic help page presented at 870 may pertain to that feature. If no particular feature was selected, then a generalized index page for the user interface as a whole, or for the current pane of the user interface, will be presented. Still further, if the user interface is still visible, and the user interacts with the user interface pane or page, the dynamic help system may update its view presented to the user to show the currently-selected pane or page. Still further, interaction with a particular user interface feature or element, may dynamically cause the help page to present information from the parsed data with respect to that particular feature. In this way, the help system can "follow along" with the user interface and the user. With all the information regarding the features identified and associated, the process ends at 895.

Figure 9:
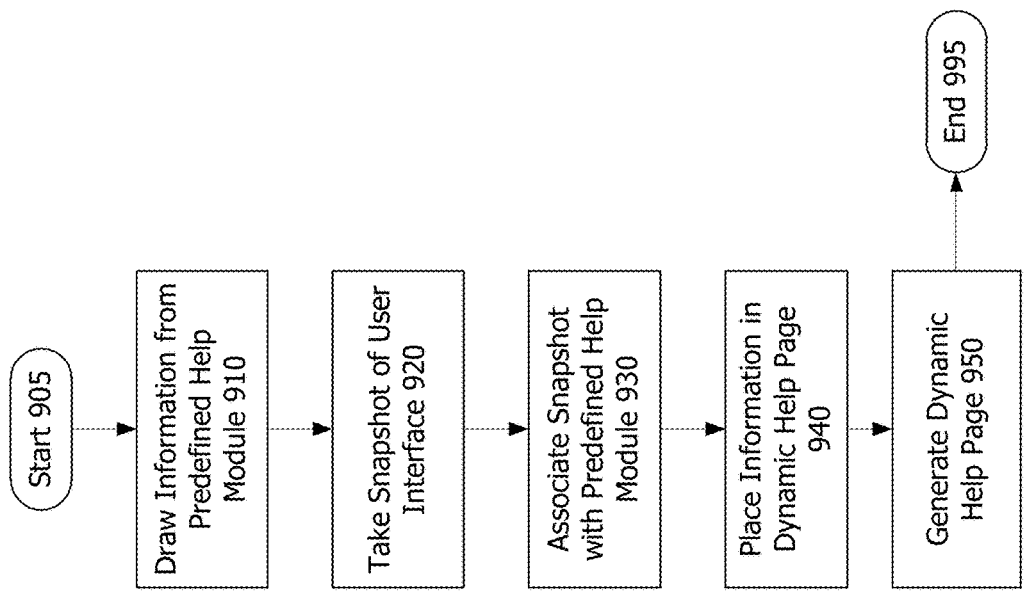
FIG. 9 is a flowchart of a dynamic help system taking snapshots to create a dynamic help window.

FIG. 9 is a flowchart of a dynamic help system taking snapshots to create a dynamic help window. The process has a start 905 and an end 995. This FIG. may take place as a sub-part of the overall process described with respect to FIG. 8, with FIG. 9 specifically focused on the creation and association of images (e.g. snapshots) of the user interface with associated help window content.

Following the start 910, the dynamic help system may identify a feature within the user interface (e.g. at 850 in FIG. 8). In response, information related to that feature may be drawn from a predefined or static help module at 910. This information may, for example, describe how a "save" or "print" function works, or may be quite specific to an individual feature (e.g. page layout options). That content may be associated by the dynamic help system with the associated feature that was detected within the user interface.

Next, a snapshot of the user interface may be taken at 920. This snapshot is an image of the associated feature within the user interface. The individual features may be defined by certain blocks, or certain RAF instructions or layout schemes. For example, as discussed below with respect to a "hole punch" function within a print driver software with respect to FIG. 14E, the parsing processing may detect that there is a "hole punch" feature using designators within the RAF instructions (similar to HTML parsing). Then, by parsing the page using an RAF instruction parser, it may determine the location within the user interface where the associated feature appears. This information may be used to set constraints (e.g. pixel locations) within the user interface for the associated feature and an image of the associated feature may be captured using screen capture functionality. Or, in some cases, an actual image may not be used, but the RAF may be parsed by associated user interface software to create the same visual image within the dynamic help system in much the same way as the RAF parsed user interface creates the associated user interface feature. In some sense this is an "image" of the user interface, but it may not be a literal screen capture, fixed image such as a jpeg or gif. In either case, the associated snapshot or image is captured at 920. The snapshot may be either an entire screenshot of the user interface, a portion of the user interface, or a pre-saved image found on a database.

Next, using the associated pre-defined help module information and the RAF layout and information about the user interface itself, the dynamic help system associates a snapshot with a predefined help module at 930. There are a multitude of manners in which the association at 930 may be accomplished. For one if the snapshot was already taken from a database, it may already be identified with a pre-defined help module. If the predefined help module is an HTML page or database, then the snapshot may have meta or other tags associating it with a particular snapshot. In other instances, the snapshot and predefined help module may literally be stored in the same file or directory on a database. The user interface parsing (845 in FIG. 8) may identify portions of the user interface based upon RAF information as the dynamic help system generates a dynamic help page and the associated feature may share a name or portion of a name.

Next, once the gathered information has been gathered it is put into a help page at 940. The information includes predefined help modules and snapshots put together. This prepares the image and associated information for display, for example, if a user selects that feature within the dynamic help page. Finally, the dynamic help page, including the snapshot, is generated at 950. This way, the help page is available for access by a requesting a user who has requested help (described with respect to FIG. 8).

The process may then end at 995.

FIGS. 10-13 show various different forms dynamic help system help pages can come in.

Figure 10:
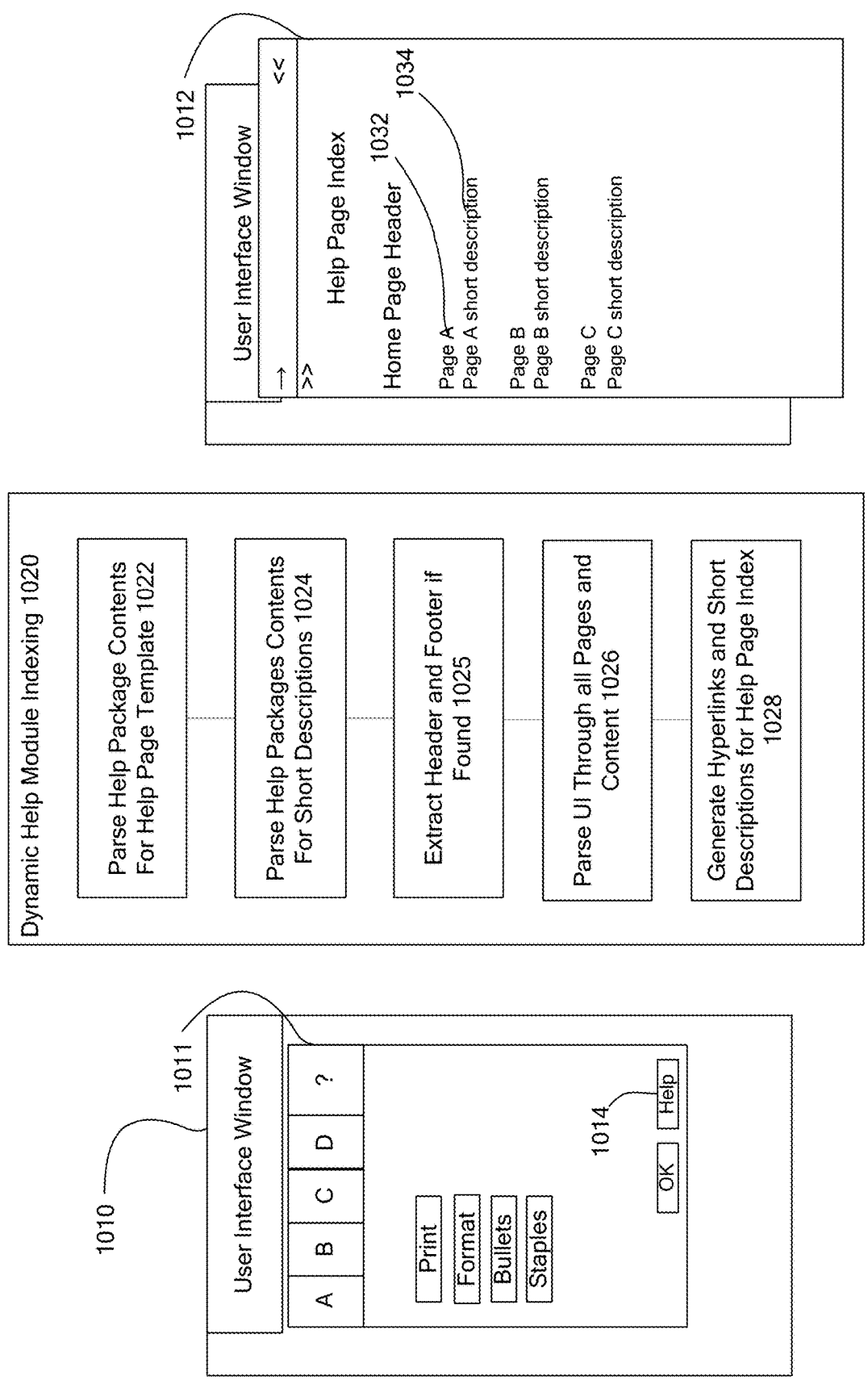
FIG. 10 is a functional diagram, and an associated flowchart of a process, of a dynamic help system partaking in help module indexing.

FIG. 10 is a functional diagram, and an associated flowchart of a process 1020, of a dynamic help system partaking in help module indexing. The user interacts with the features of the user interface window 1010. After selecting the help button 1014 or information button 1011, the dynamic help system begins generating an index page by engaging in the dynamic help module indexing process 1020. The process begins at 1022 where the user interface 1010 is parsed to determine if there are any features that already have a static (pre-existing or hard-coded) help package associated with them. At this step, the parsing also helps the system determine if there is an existing help page template (e.g. formatting for help pages generally).

In addition, many static help pages incorporate short descriptions of the purpose of each page (e.g. A, B, C, D in FIG. 10). If those exist in the static help pages, then those are also parsed by the system at 1024 to incorporate that information into the help page index 1012. Next, if the pages or the features contain HTML or are HTML pages themselves, the dynamic help system may parse for headers and footers as well at 1025. The header and footer may themselves contain or even be the short description of the help package contents. Then, the process parses each of the pages associated with the user interface to determine the contents of each for purposes of generating underlying pages for the help page index 1012. Once the features and help packages have been identified, the help packages are recursively parsed to see if there are any contents associated with them. In the context of generating a help page index 1012, a short description in the help package that corresponds to detected pages and/or features are detected using keyword matching. However, there are other instances in which other contents may be searched for such as pictures, animations, links to websites, videos, or other contents found in help package contents.

With all the information gathered, dynamic help system then generates hyperlinks and short descriptions at 1028 so that they may be used as the help page index 1012. Finally, the gathered hyperlinks and short descriptions may be displayed in a meaningful way to the user in a manner similar to that of the help page index 1012. The user can see the title of the feature, for example, Page A 1032, and a short description of the feature, for example, of Page A 1034. Depending on whether there is additional detail available in the help system, the title 1032, and short description 1034 may themselves be hyperlinks.

This is useful to the user because all relevant information is displayed on a single page to the user. If the user needs to view a particular, other page or read more information about a page, they need only click a link above the short description. Help page index 1012 shows title 1032 as "Page A" (which could be a hyperlink itself) and short description 1034 "Page A short description" underneath. The user should quickly understands the nature of page A after reading the description underneath, and can navigate to Page A in the user interface, or to further information about Page A (depending on the context and the setup used) by clicking the Page A link.

The dynamic help system can also generate a generic page that lists generic information about a user interface page and user interface features that a user may see in a page. Such a page may display header and/or footer information and other descriptions coming from help content package files relating to the requested page and the dynamically created part that shows a hyperlink list of features that currently exist in the page.

Figure 11:
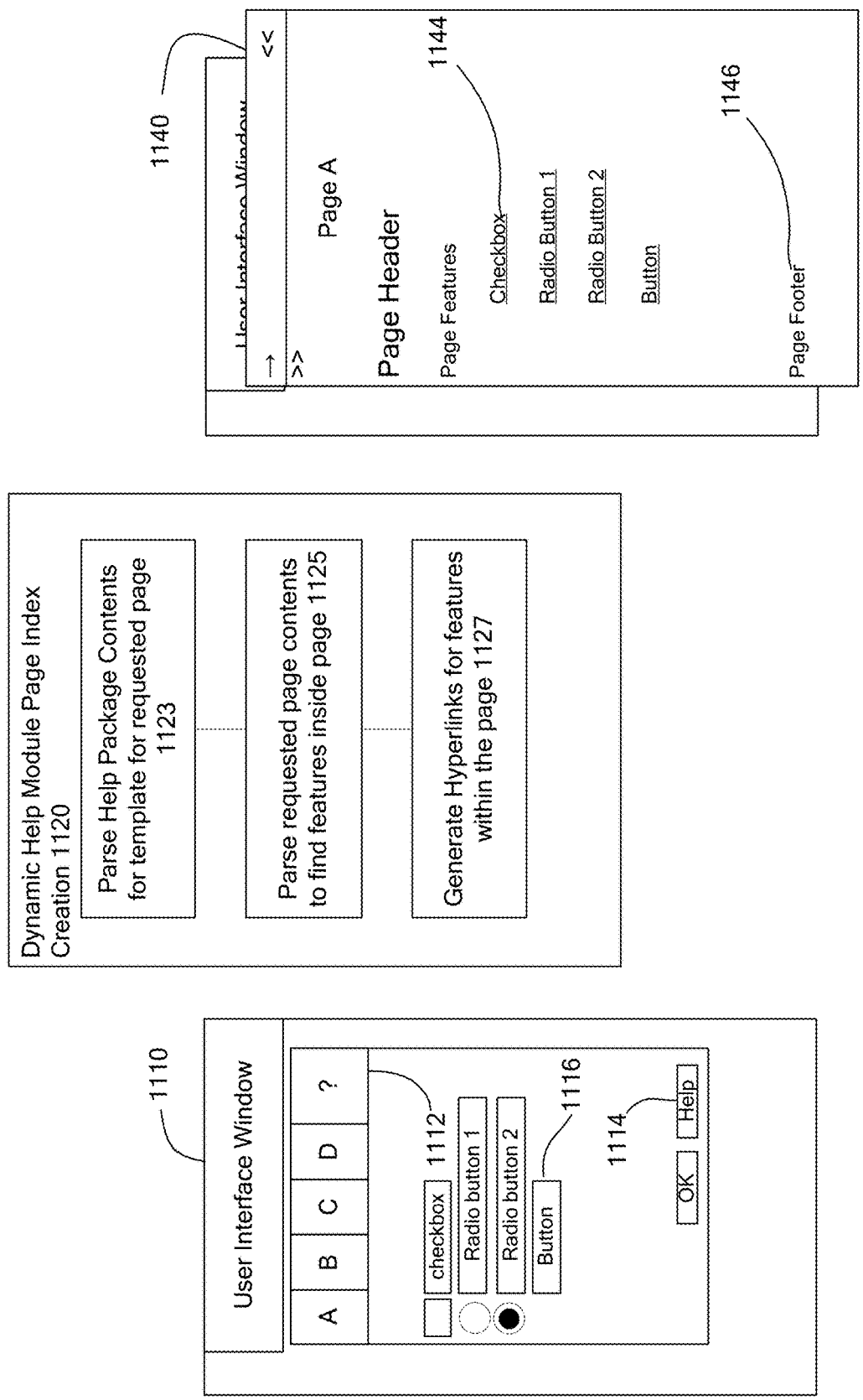
FIG. 11 is a is a functional diagram, and an associated flowchart of a process, of a dynamic help system used in module page index creation.

FIG. 11 is a is a functional diagram, and an associated flowchart of a process, of a dynamic help system used in module page index. Some of the elements in FIG. 11 are the same or similar to those in FIG. 10. A user may be presented with a user interface window 1110 that contains certain features "button" 1116 for example. A user may also be presented with a help button 1114 and information button 1112. Upon pressing the help button 1114 or information button 1112, the dynamic help module page index creation process 1120 begins. First the dynamic help system parses help package contents to see if there is a template page for the help system at 1123. This template may be stored in a database, within the software itself, or may be a configuration file or example template that is to be used for all help index pages.

Next requested page contents are parsed to find features inside a page. Finally, at 1227 hyperlinks are generated for the features within the page. Note that dynamic help system may combine information from a template request page of 1223 and a module associated from features in 1225.

Next, using this template, a help page index 1140 will be created for a user to browse and navigate. In this index page the title of features will be shown as hyperlinks. To Accomplish this, the contents of the various user interface pages and tabs are parsed and features within each are likewise parsed at 1125. Then, hyperlinks are created for each of those features within each page at 1127. Example feature 1144 is titled checkbox and is a hyperlink. A page footer 1146, is also generated if a page footer is present in the user interface or if the help system has additional information to pass along to a user. This footer 1146 may contain navigation to other pages, hyperlinks and contain copyright info. The page footer 1146 may also be used as a form of navigation within the user index. In another form, the dynamic help system may create a help page while taking a snapshot of a user element, and display other help contents.

Figure 12:
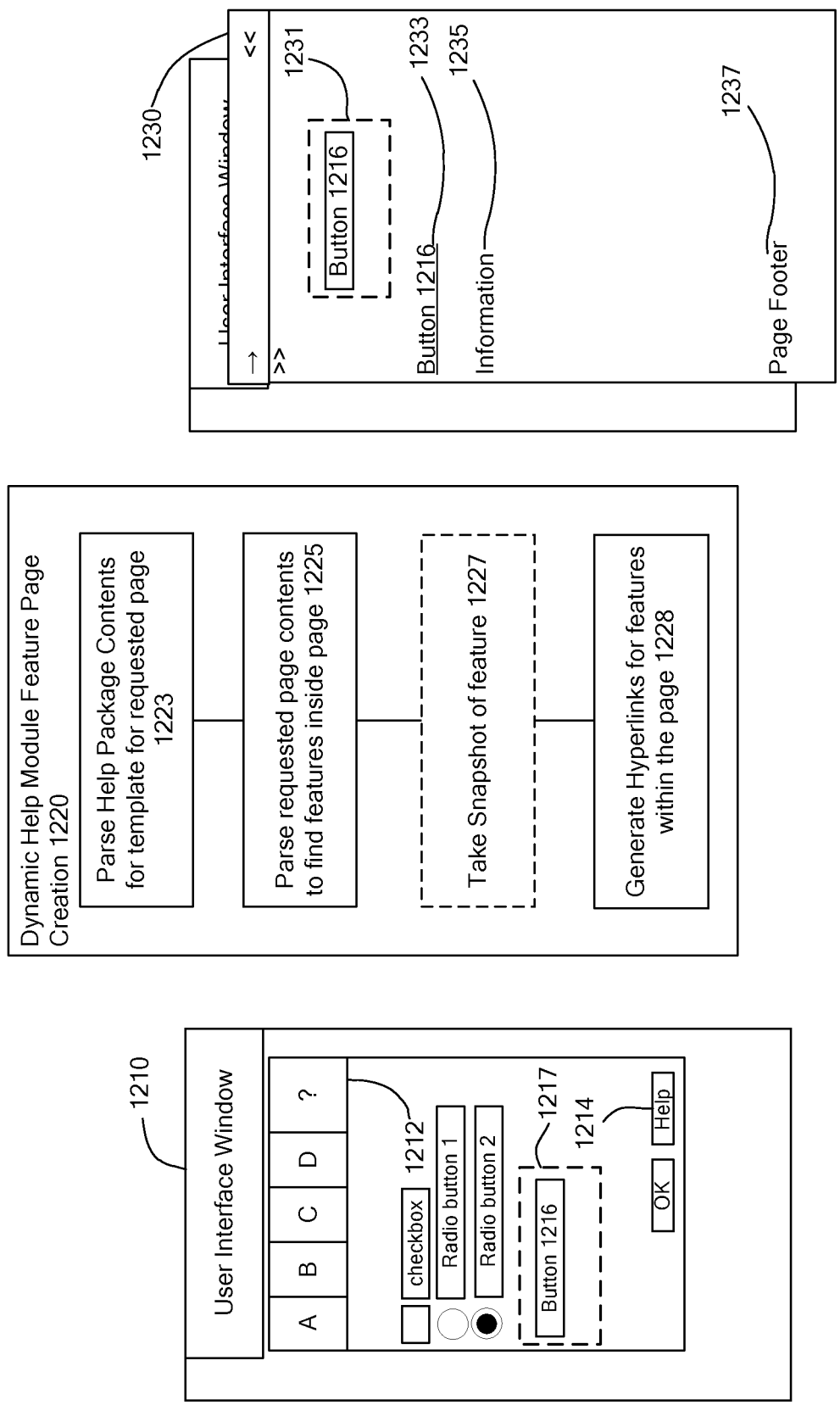
FIG. 12 is a functional diagram, and an associated flowchart of a process, of a dynamic help system used in help module feature creation.

Turning to FIG. 12 is a functional diagram, and an associated flowchart of a process 1220, of a dynamic help system used in help module feature creation. On the left, a user interface window 1210 displaying multiple user features such as button 1216 is presented. As with earlier figures, the help button 1214 and information button 1212 are also visible. A selection window 1217 is also seen in this version of the user interface. This selection window becomes visible when a user hovers the mouse over a particular feature, the selection window may become visible over another feature. In other cases the selection window 1217 is not visible to the user. In others, a mouse need not hover over the selection window 1217. A user may select box 1217 by clicking on it while a mouse is hovered over 1217.

Once a user selects a feature encapsulated by 1217 the dynamic help module feature page creation process 1220 starts. At 1223 dynamic help system parses help package contents for a template of the requested page feature. This is similar to that process discussed above. Next, at 1225, the pages contents are parsed to find features inside the page. In some cases a snapshot of a feature may be found at 1225. However, in other circumstances no such snapshot may be found and the dynamic help system may have to create a snapshot from a piece of the user interface window 1210 itself. If the snapshot is pre-existing (e.g. within a static help system or as a part of the data for the user interface layout itself), then the system may proceed using that snapshot. If no snapshot is present, then at 1227 a snapshot of the selected or highlighted portion of the user interface 1210 corresponding to selection window 1217 is taken and stored in memory.

In some cases, rather than selecting an individual portion of the user interface, the dynamic help system may take snapshots of all of the features discovered during the parsing of the page and features for the user interface. In such cases, as each feature is discovered, a snapshot may be taken automatically and associated in the help page index 1230 or other sub-pages with the associated feature so that the snapshot appears on the associated help page. In this way, as a user navigates the help system, actual images of the associated features and systems may be presented to the user in association with the features with which they operate. Hyperlinks for features within the page, including the snapshot taken at 1227, are generated in 1228.

When process 1220 completes, the dynamic help system may display help window 1230. The contents of this help page 1230 as a part of a help system. The index or a subpage may include snapshot 1231 of the feature selected from 1210. Help page 1230 also shows title 1233 of the feature within snapshot 1231. Title 1233 may be a hyperlink to other pages, or a link back to user interface 1210. The snapshot 1231 may also be a hyperlink back to the associated portion of the user interface 1210. Having title 1233 or snapshot 1231 as links is useful because once a user has read what they need to read from help page 1230, rather than exiting out of the help page 1230, and navigating back to a specific part of user interface 1210, the user may simply return to the exact part of user interface 1210 that he or she just learned about in the help system. Information 1235 may also be displayed below 1233. A footer 1237 may also be displayed at the bottom of help window 1230. These locations may have additional information about the feature or the page or provide navigation options within the help system.

Figure 13:
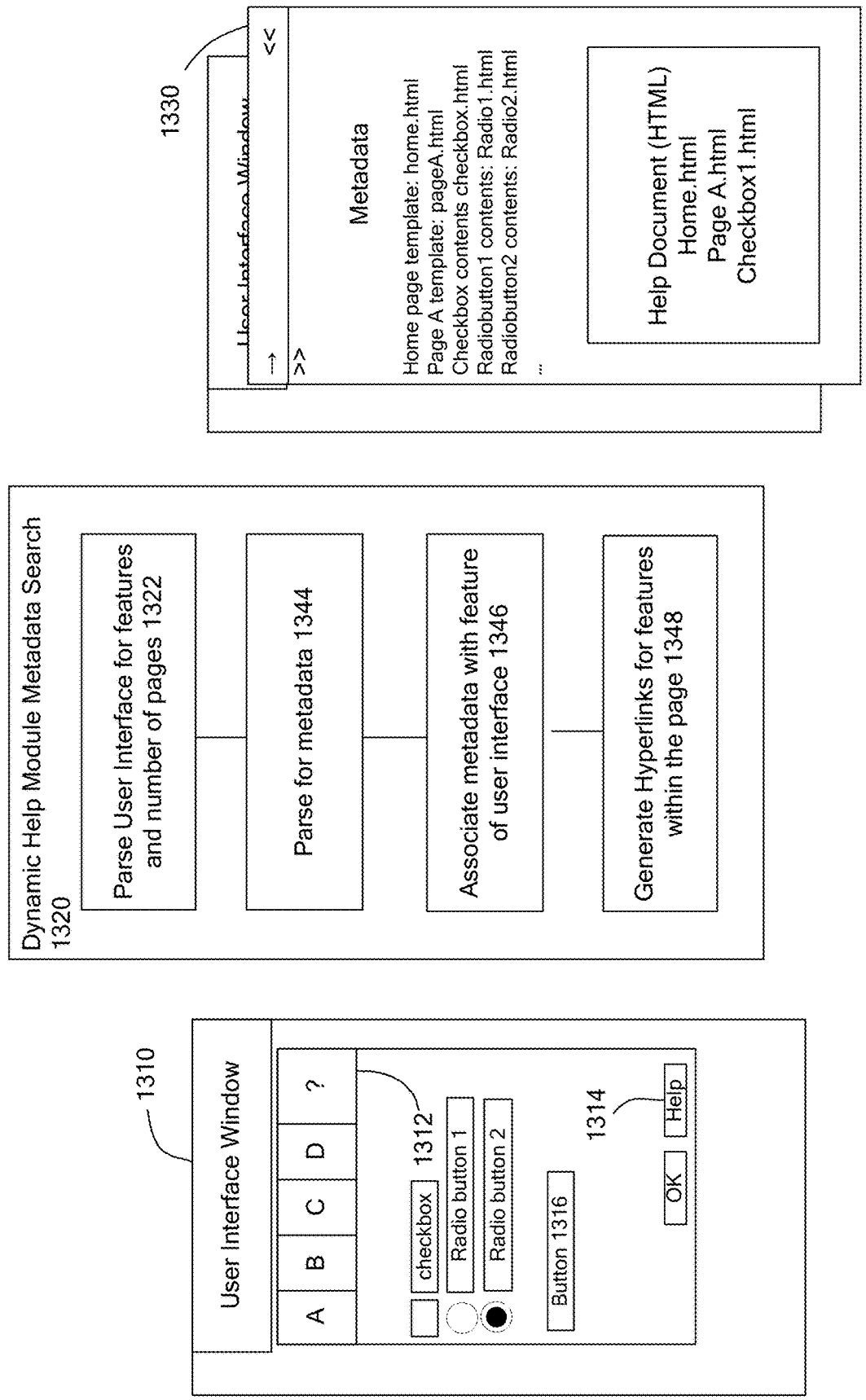
FIG. 13 is a functional diagram, and an associated flowchart of a process, of a dynamic help system used in a help module metadata search.

FIG. 13 shows a functional diagram, and an associated flowchart of a process 1320, of a dynamic help system used in a help module metadata search. FIG. 13 shows a user interface 1310 that displays multiple features a user may interact with. The user interface is again equipped with help button 1314 and information button 1312. A feature such as button 1316 may be interacted with by a user. When a user selects help button 1314 or information button 1312, the dynamic help module metadata process 1320 may start.

At 1322 dynamic help system may parse the user interface 1310 for features on the various pages of user interface 1410, as well as for how many pages make up the user interface. Next at 1344 each page is parsed for metadata. Metadata may be found as actual metatags, tags put into html documents that denote data as being metadata, tags used as a part of the RAF structure itself as HTML or HTML-like tags, or by some other designator programmed into dynamic help system. For example, metadata may be stored as footer data, the title of the page, or any other designation dynamic help system is programmed to identify as metadata. The metadata is then associated with a feature of the user interface at 1346. For example, if a particular html page contains data on button 1316, and that html page has a metadata tag, the metadata tag would then be associated with button 1316. Finally, hyperlinks for the features within page 1310 are generated at 1348. When process 1320 completes, the system may display a help page 1330 to the user, the help page 1330 containing both metadata and a help document. The metadata may be either pulled directly from step 1444, or further processed by the dynamic help system before being shown to the user. The metadata may be used for other purposes, such as updating a static help page or for enabling API access to help-related information.

Help packages contain metadata information which may explain which part of the user interface content file included in packages loaded by dynamic help system should be used. When the user requests a help page (for example, of a home page or main index page, help page for a user interface page, help page for a particular feature), dynamic help system uses the knowledge of the current user interface, help package contents, and metadata to a dynamic help page that displays at least some metadata.

Figure 14A:
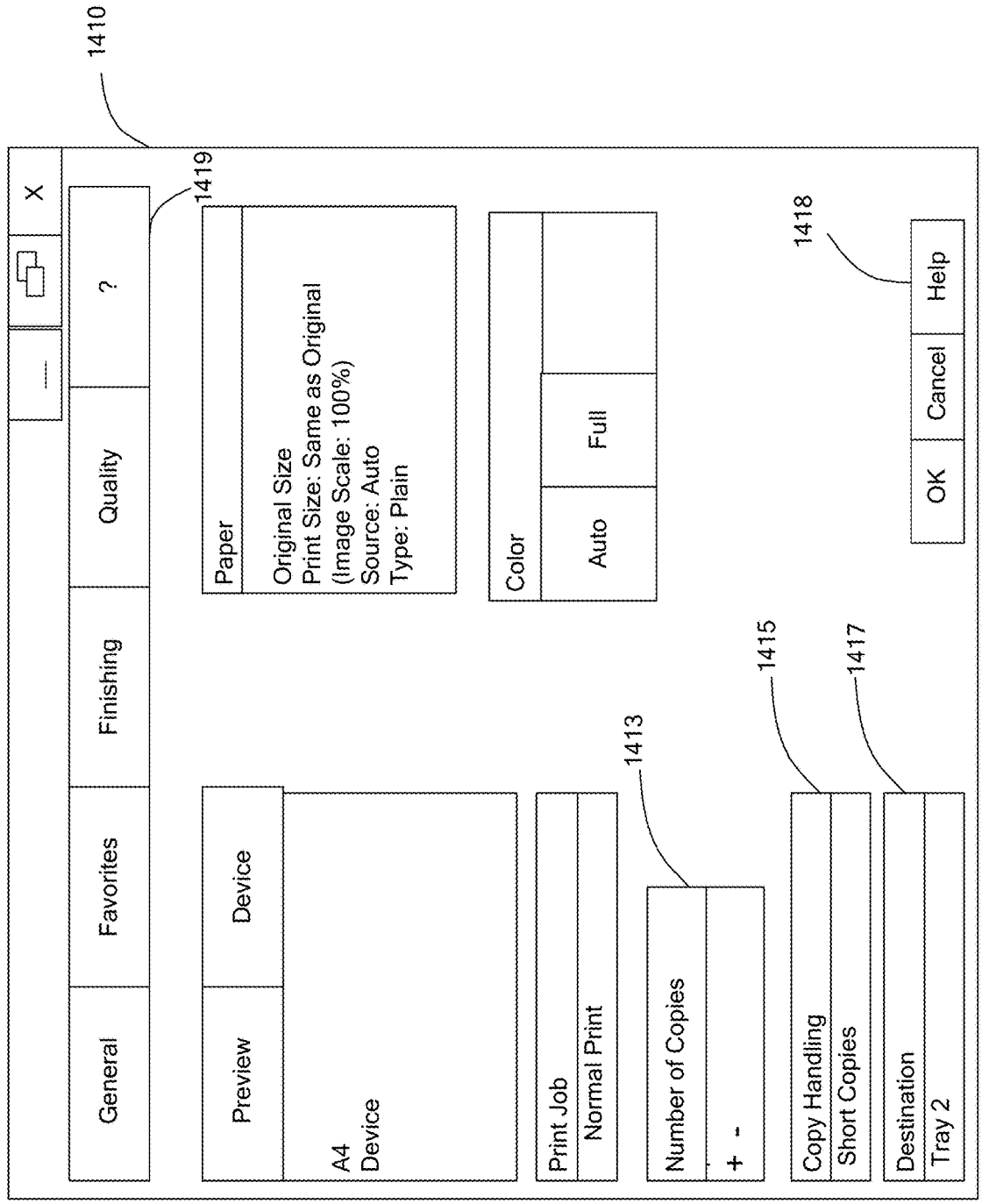
FIG. 14A is a diagram of a user interface and a user activating a dynamic help system.
Figure 14B:
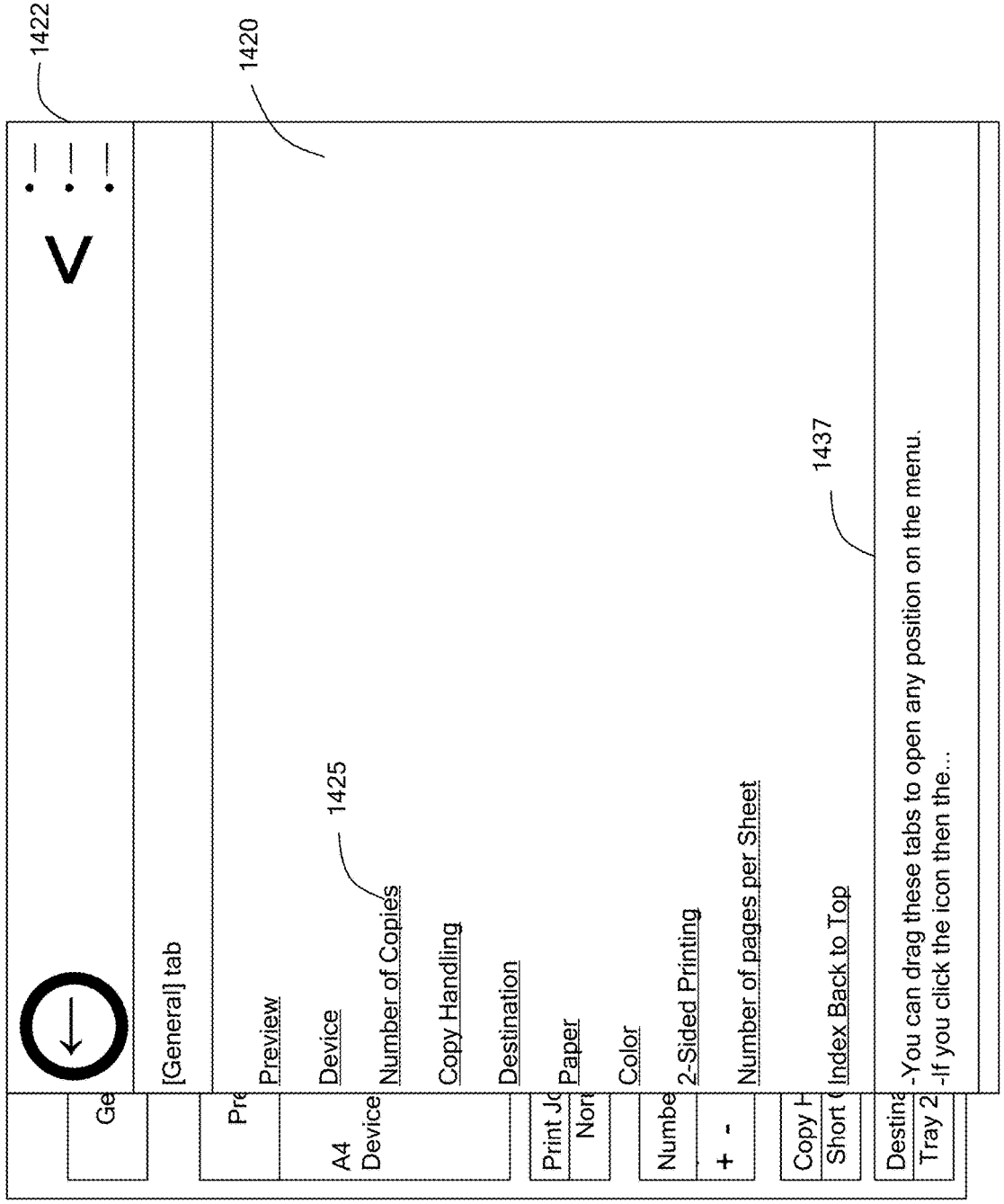
FIG. 14B is a diagram of a popup that appears over the user interface.

A more concrete example of the dynamic help system in action can be seen in the series of FIGS. 14A-14F. Turning to FIG. 14A, a diagram of a user interface and a user activating a dynamic help system is shown. The user interface 1410 generated from HTML or other hypertext language is shown. User interface 1410 could be a part of a software application such as Microsoft® Word® or Adobe®. A user has likely been editing a document of some kind and is ready to print the document. User interface 1410 displays after a user hits a "print" button. User interface 1410 contains features that affect printing such as a number of copies function 1413, copy handling function 1415, and a destination function 1417. Note other functions not displayed in FIG. 14A may also be implemented. A user may interact with any number of the aforementioned functions to change how a print job is conducted. Along with user features, user interface 1410 is equipped with help button 1418 and information button 1419. Selecting these buttons will activate dynamic help system. In FIG. 14A dynamic help system is programmed to create the index help page.

Turning to 14B, a diagram of a popup that appears over the user interface is shown. Here, a user has selected either the help 1418 (FIG. 14A) or information button 1419 (FIG. 14A) and the dynamic help system has generated a pop-up help panel 1420. Pop up help panel 1420 has a navigation bar 1422 that can be used to go through index pages. Pop up help panel 1420 also has hyperlinks such as hyperlink 1425 that correspond to features from page 1410. There is also a footer at 1437. The footer may display metadata gleamed by the dynamic help system, or change as a viewer moves the cursor over links such as 1425.

Figure 14C:
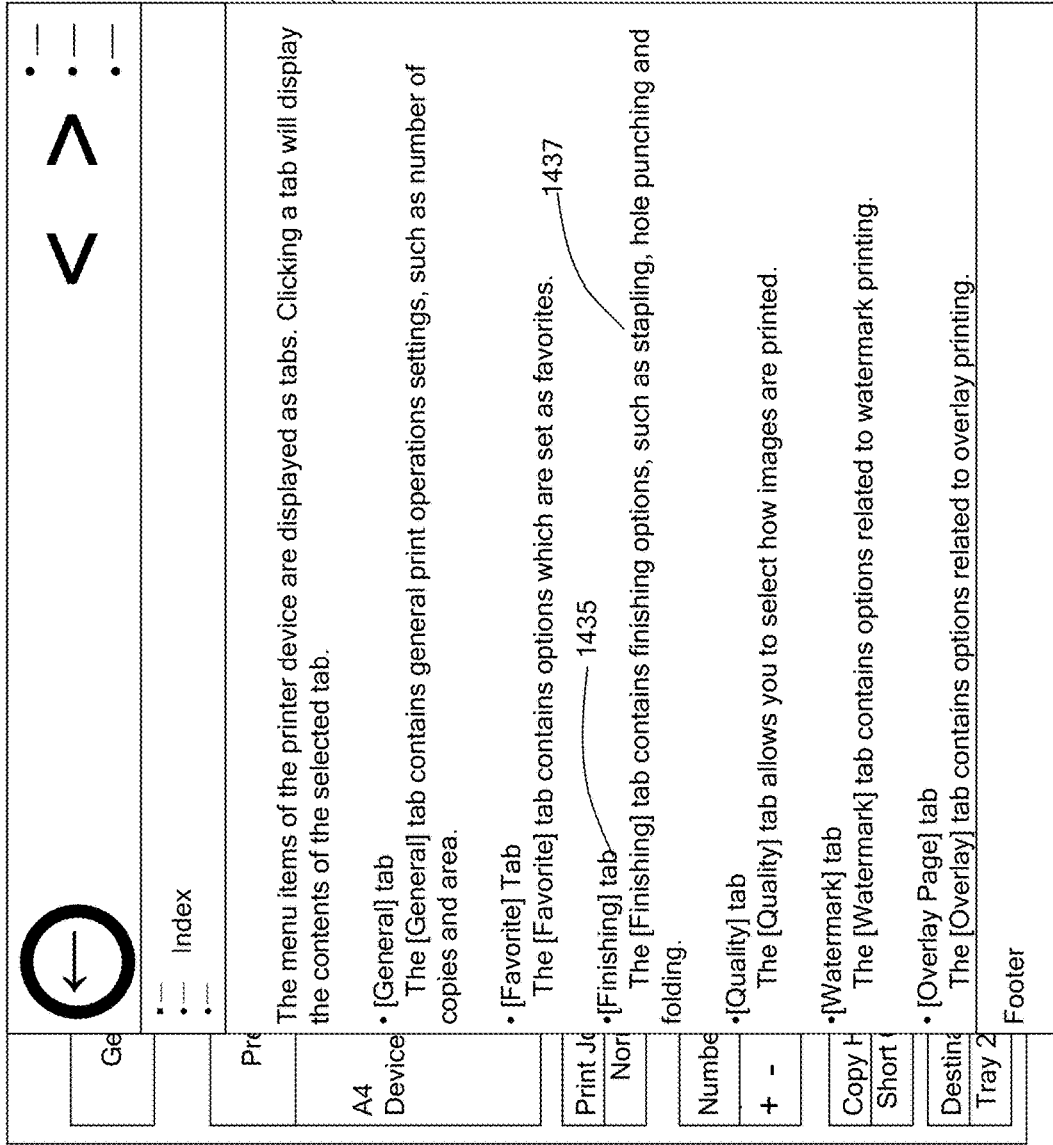
FIG. 14C is a diagram of a dynamic help system creating an index page of a dynamic help system.
Figure 14D:
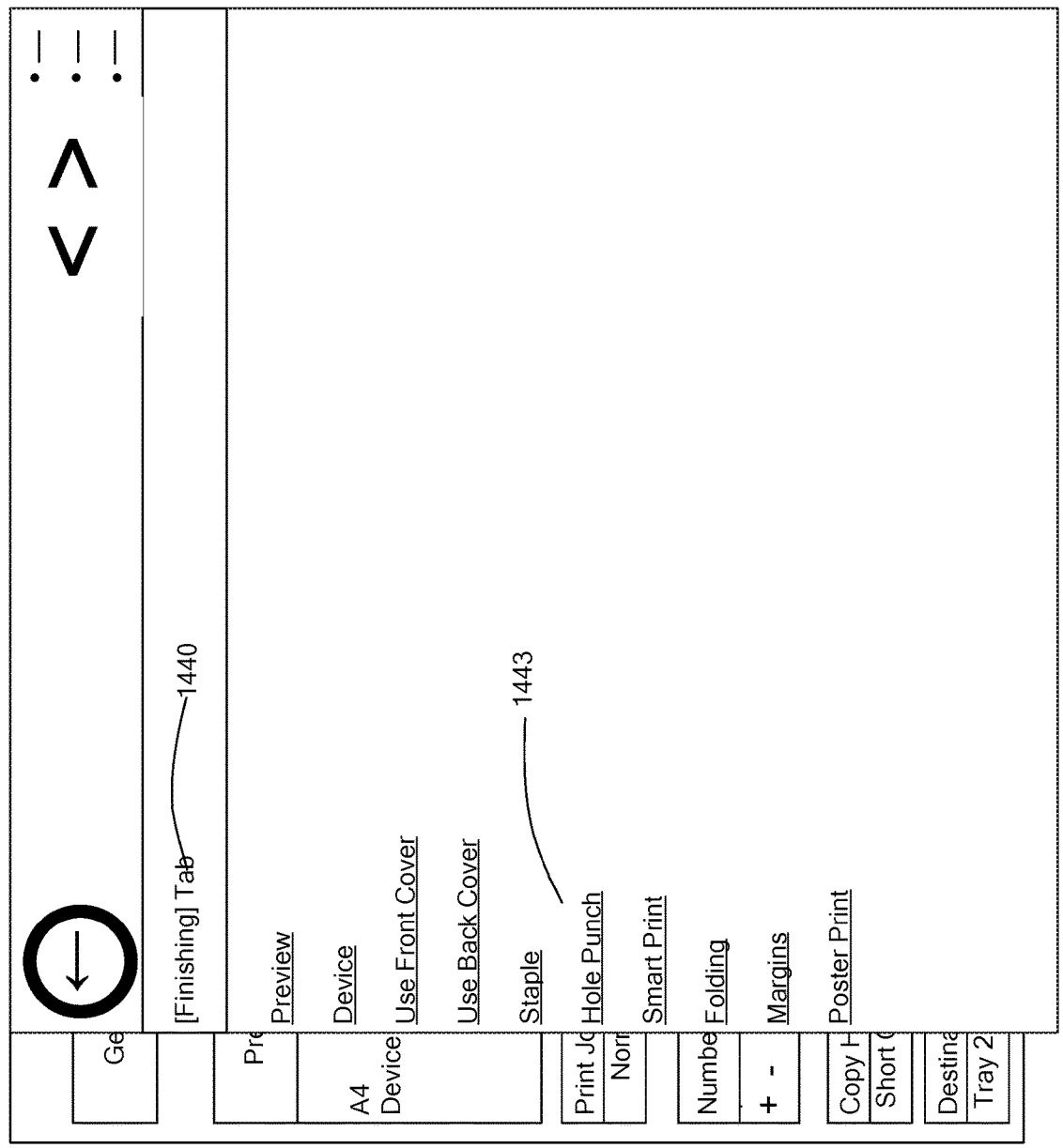
FIG. 14D is a diagram of a user interacting with an index page of a dynamic help system.

Turning to FIG. 14C, a diagram of a dynamic help system creating an index page of a dynamic help system is shown. Here, the dynamic help system has populated the help panel 1430 with information such as 1437 regarding hyperlinks. The user in FIG. 14C may select finishing tab 1435. Thereafter, FIG. 14D is shown, which is a diagram of a user interacting with an index page of a dynamic help system. Here, the dynamic help system has populated the page with information regarding the Finishing tab 1440. Links in the page refer to functions the finishing tab in the user interface can be used to perform. A user selects the function hole punch 1443 in this example.

Figure 14E:
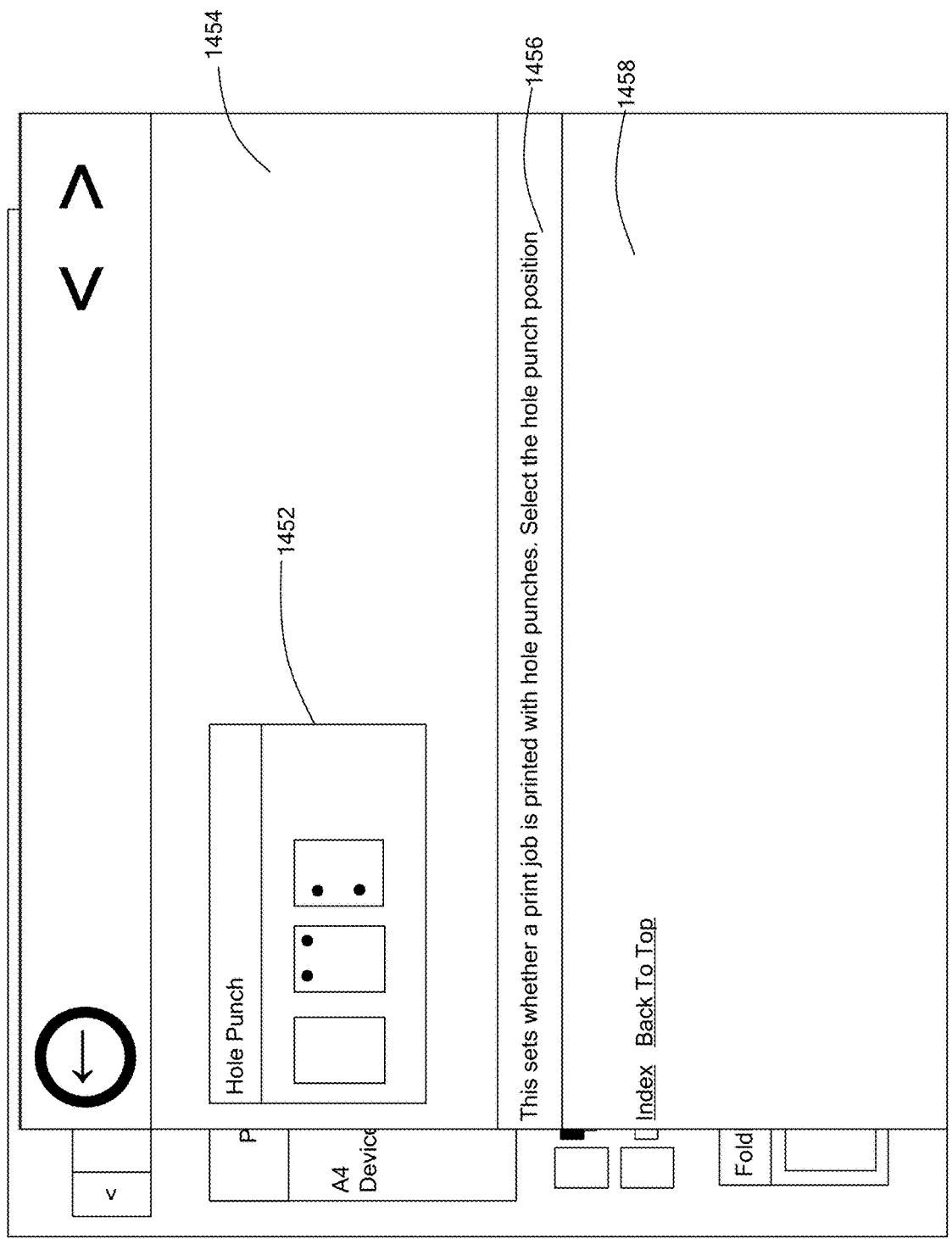
FIG. 14E is a diagram of a dynamic help system generating a dynamic help page.

Then, FIG. 14E may be shown. FIG. 14E is a diagram of a dynamic help system generating a dynamic help page. Here, upon selecting hole punch 1443 from FIG. 14D, page 1454 appears. dynamic help system has generated a snapshot 1452 of the hole punch function. This snapshot may have been taken by dynamic help system prior to generating the page or been found when dynamic help system parsed help packages and other data. The snapshot may be generated on-demand, after a user makes the selection of that feature in FIG. 14D, or may be pre-generated at the outset when all pages are parsed and stored for later access by the dynamic help system. The snapshot itself may be a link to more information, a link to other pages, or a way for the user to modify the print function itself. Description 1456 contains information about the holepunch function. A navigation menu 1458 also appears at the bottom. Navigation pane 1458 may also contain footer data pertaining to feature 1452.

Figure 14F:
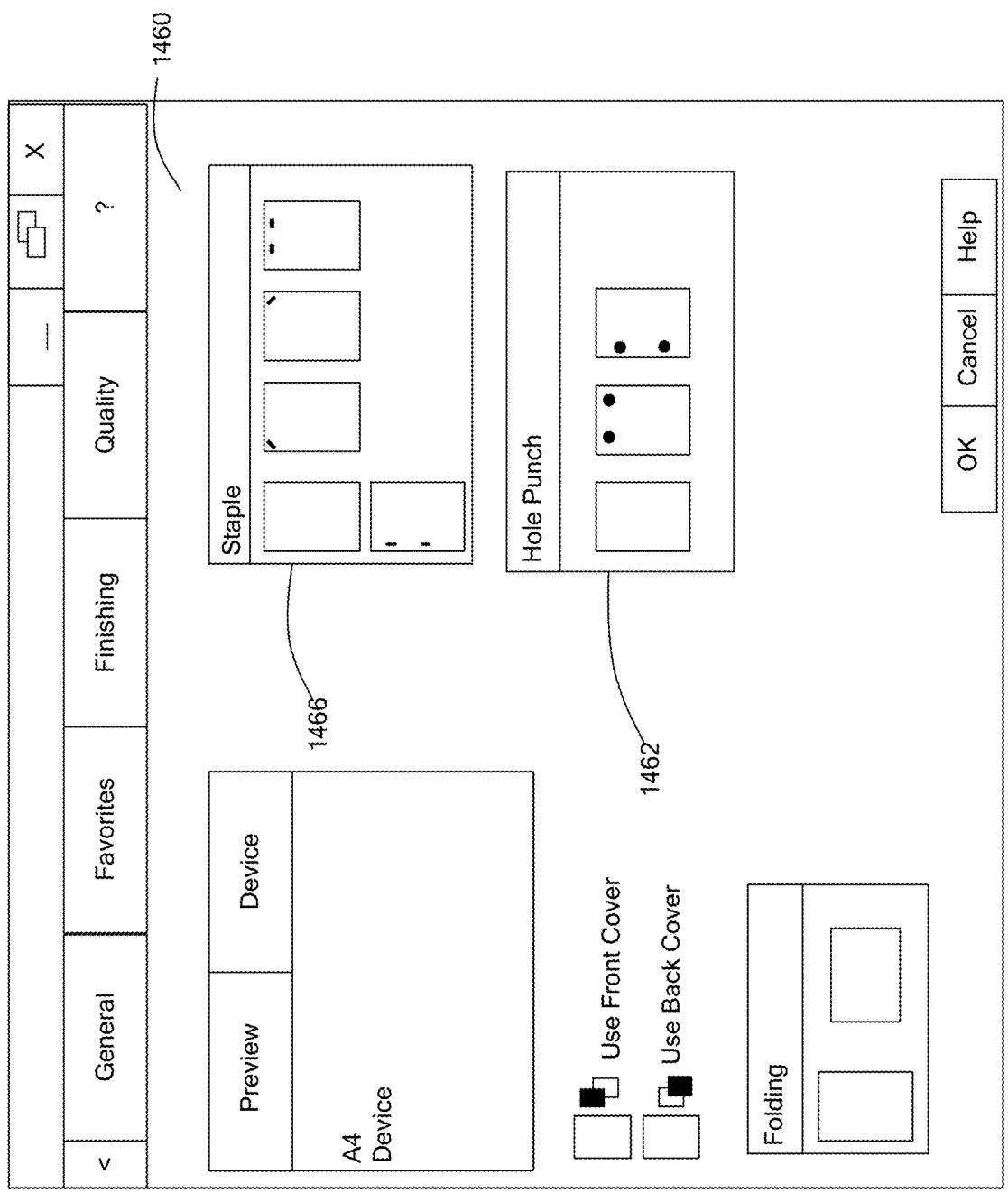
FIG. 14F is a diagram of a user interacting with a dynamic help page.

When a user selects (e.g. clicks on) snapshot 1452 of the hole punch feature, they may then taken directly to the associated feature as shown in FIG. 14F. FIG. 14F is a diagram of a user interacting with a dynamic help page. Here, the user is presented with the portion of the user interface 1460 containing the hole punch function 1462 shown in snapshot 1452 (FIG. 14E). The user interface 1460 includes the hole punch feature 1462 and other options regarding feature 1462. The staple feature 1466 is also shown, along with other corresponding features such as adjusting where staples are placed on an associated document. In this way, the dynamic help system can be used to generate snapshots that may, themselves, be used to direct a user back to the desired function within the user interface itself using a dynamic hyperlink (or similar functionality).

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system comprising a computing device including:
   a processor;
   a display device coupled to the processor;
   a memory coupled to the processor, the memory storing a program including instructions which, when executed on the processor, causes the computing device to perform actions, comprising:
   generating a user interface on the display device from a hypertext file, the user interface including a discrete feature on a page of the user interface including a help button;
   detecting a user interaction with the help button;
   in response to detecting the user interaction with the help button,
   parsing the hypertext file to detect each page of the user interface and each discrete feature of each page of the user interface,
   accessing a database of pre-defined help modules, which include a pre-defined help module associated with the discrete feature of the user interface,
   updating the user interface to display a dynamic help page, wherein the dynamic help page includes information from the pre-defined help module associated with the discrete feature, wherein the information and the discrete feature are visible on the dynamic help page, and wherein the dynamic help page includes a hyperlink to access additional information relating to the discrete feature, and
   in response to detecting a user interaction with the hyperlink, updating the dynamic help page to display a subsidiary dynamic help page including the additional information relating to the discrete feature; and
   in response to a user request for information regarding a specific discrete feature:
   generating a snapshot image of the specific discrete feature from one of the pre-defined help modules associated with the specific discrete feature,
   displaying the snapshot image unaltered if the user interface has not substantially changed, and
   displaying the snapshot image that is modified if the user interface has substantially changed.

2. The system of claim 1, wherein the instructions, when executed on the processor, causes the computing device to perform further actions, comprising:
   detecting a user interaction with the user interface to cause the discrete feature to move from a first location to a second location on the user interface; and
   in response to detecting the user interaction with the user interface to cause the discrete feature to move from the first location to the second location, updating the user interface to display the discrete feature at the second location and updating the database to associate one of the pre-defined help modules that was associated with the discrete feature at the first location, to the discrete feature at the second location.

3. The system of claim 1, wherein new help modules are generated by a Rich Application Framework package taking snapshot images of the user interface and putting the snapshot images into a sequence corresponding to a layout of the user interface.

4. The system of claim 3, wherein each new help module contains pictures, gifs, animations, or links to other websites.

5. A method of generating a dynamic help system for a user interface comprising;
   generating the user interface on a display device from a hypertext file, the user interface including a discrete feature on a page of the user interface including a help button;
   detecting a user interaction with the help button;
   in response to detecting the user interaction with the help button,
   parsing the hypertext file to detect each page of the user interface and each discrete feature of each page of the user interface,
   accessing a database of pre-defined help modules, which include a pre- defined help module associated with the discrete feature of the user interface,
   updating the user interface to display a dynamic help page, wherein the dynamic help page includes information from the pre-defined help module associated with the discrete feature, wherein the information and the discrete feature are visible on the dynamic help page, and wherein the dynamic help page includes a hyperlink to access additional information relating to the discrete feature, and in response to a user interaction with the hyperlink, updating the dynamic help page to display a subsidiary dynamic help page including the additional information relating to the discrete feature;

detecting a user interaction with the user interface to cause the discrete feature to move from a first location to a second location on the user interface; and in response to detecting the user interaction with the user interface to cause the discrete feature to move from the first location to the second location, updating the user interface to display the discrete feature at the second location and updating the database to associate one of the pre-defined help modules that was associated with the discrete feature at the first location, to the discrete feature at the second location.

6. The method of claim 5, further comprising:

in response to a user request for information regarding a specific discrete feature;
  generating a snapshot image of the specific discrete feature from one of the predefined help modules;
  displaying the snapshot image unaltered if the user interface has not substantially changed; and
  displaying the snapshot image that is modified if the user interface has substantially changed.

7. A non-transitory machine-readable medium storing a program including instructions executable on a processor of a computing device, wherein the instructions when executed on the processor causes the computing device to perform actions, comprising: generating a user interface on a display device of the computing device from a hypertext the user interface including a discrete feature on a page of the user interface including a help button; detecting a user interaction with the help button; in response to detecting the user interaction with the help button, parsing the hypertext file to detect each page of the user interface and each discrete feature of each page of the user interface; accessing a database of pre-defined help modules, which include a pre-defined help module associated with the discrete feature of the user interface; updating the user interface to display a dynamic help page, wherein the dynamic help page includes information from the pre-defined help module associated with the discrete feature, wherein the information and the discrete feature are visible on the dynamic help page, and wherein the dynamic help page includes a hyperlink to access additional information relating to the discrete feature, and in response to detecting a user interaction with the hyperlink, updating the dynamic help page to display a subsidiary dynamic help page including the additional information relating to the discrete feature; and generating new help modules that include a plurality of snapshot images of the user interface, that are in a Rich Application Framework (RAF) format, wherein the plurality of snapshot images are in a sequence corresponding to a layout of the user interface.

8. The non-transitory machine-readable medium according to claim 7, wherein the actions performed by the computing device further include: detecting a user interaction with the user interface to cause the discrete feature to move from a first location to a second location on the user interface; and in response to detecting the user interaction with the user interface to cause the discrete feature to move from the first location to the second location, updating the user interface to display the discrete feature at the second location and updating the database to associate one of the pre-defined help modules that was associated with the discrete feature at the first location, to the discrete feature at the second location.

9. The non-transitory, machine-readable medium according to claim 7, wherein the actions performed by the computing device further include: in response to a user request for information regarding a specific discrete feature: generating a snapshot image of the specific discrete feature from one of the pre-defined help modules; displaying the snapshot image unaltered if the user interface has not substantially changed; and displaying the snapshot image that is modified if the user interface has substantially changed.

10. The non-transitory machine-readable medium according to claim 7, wherein each new help module contains pictures, gifs, animations, or links to other websites.

\* \* \* \* \*